US012809235B2

(12) United States Patent
Uemura

(10) Patent No.: US 12,809,235 B2
(45) Date of Patent: Nov. 24, 2026

(54) OPTICAL APPARATUS COMPRISING A THIRD LENS MOVABLE IN AN OPTICAL AXIS DIRECTION

(71) Applicant: CANON KABUSHIKI KAISHA, Tokyo (JP)

(72) Inventor: Kohei Uemura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 198 days.

(21) Appl. No.: 18/822,994

(22) Filed: Sep. 3, 2024

(65) Prior Publication Data

US 2025/0102888 A1 Mar. 27, 2025

(30) Foreign Application Priority Data

Sep. 22, 2023 (JP) ................................ 2023-156593

(51) Int. Cl.
*G03B 17/14* (2021.01)
*G03B 5/02* (2021.01)

(52) U.S. Cl.
CPC ............... *G03B 17/14* (2013.01); *G03B 5/02* (2013.01); *G03B 2205/0015* (2013.01); *G03B 2205/0046* (2013.01)

(58) Field of Classification Search
None
See application file for complete search history.

(56) References Cited

U.S. PATENT DOCUMENTS

| | | | | |
|---|---|---|---|---|
| 7,903,356 B1 * | 3/2011 | Kato | G02B 7/102 | 359/811 |
| 2007/0195429 A1 * | 8/2007 | Kobayashi | G02B 7/022 | 359/700 |
| 2011/0069403 A1 * | 3/2011 | Oikawa | G02B 7/102 | 359/817 |

FOREIGN PATENT DOCUMENTS

| | | | |
|---|---|---|---|
| JP | 2019184802 A * | 10/2019 | G03B 21/142 |
| JP | 2022117037 A | 8/2022 | |
| JP | 2023025876 A * | 2/2023 | G02B 27/646 |

* cited by examiner

*Primary Examiner* — Paul C Lee
(74) *Attorney, Agent, or Firm* — Cowan, Liebowitz & Latman, P.C.

(57) ABSTRACT

An optical apparatus includes a first holder holding a first lens, and a second holder holding a second lens, the first holder and the second holder being arranged in an optical axis direction, a base member configured to hold the first holder and the second holder so that positions of the first holder and the second holder are adjustable, and an elastic member engaged with and provided between the first holder and the second holder. The elastic member biases the first holder and the second holder so that the first holder and the second holder approach each other in the optical axis direction and contact the base member.

5 Claims, 19 Drawing Sheets

OPTICAL APPARATUS COMPRISING A THIRD LENS MOVABLE IN AN OPTICAL AXIS DIRECTION

BACKGROUND

Technical Field

The present disclosure relates to an optical apparatus such as an interchangeable lens or a digital camera.

Description of Related Art

In a case where the sensitivity to the optical performance of a position (decentering position and tilt position) of a lens is high in an optical apparatus, it is important to highly accurately adjust the position of the lens. Japanese Patent Laid-Open No. 2022-117037 discloses an adjusting mechanism configured to adjust a lens position by using an elastic member (spring).

The adjusting mechanism disclosed in Japanese Patent Laid-Open No. 2022-117037 includes elastic members corresponding to a plurality of lens units to be adjusted. In addition, an actuator configured to drive a lens other than the lens to be adjusted is disposed at a position avoiding the plurality of elastic members. Thus, it is difficult to reduce the size of the optical system.

SUMMARY

An optical apparatus according to one aspect of the disclosure includes a first holder holding a first lens, and a second holder holding a second lens, the first holder and the second holder being arranged in an optical axis direction, a base member configured to hold the first holder and the second holder so that positions of the first holder and the second holder are adjustable, and an elastic member engaged with and provided between the first holder and the second holder. The elastic member biases the first holder and the second holder so that the first holder and the second holder approach each other in the optical axis direction and contact the base member.

Further features of the disclosure will become apparent from the following description of embodiments with reference to the attached drawings.

DETAILED DESCRIPTION

An example of the present disclosure will be described below with reference to the accompanying drawings.

Figure 1A:
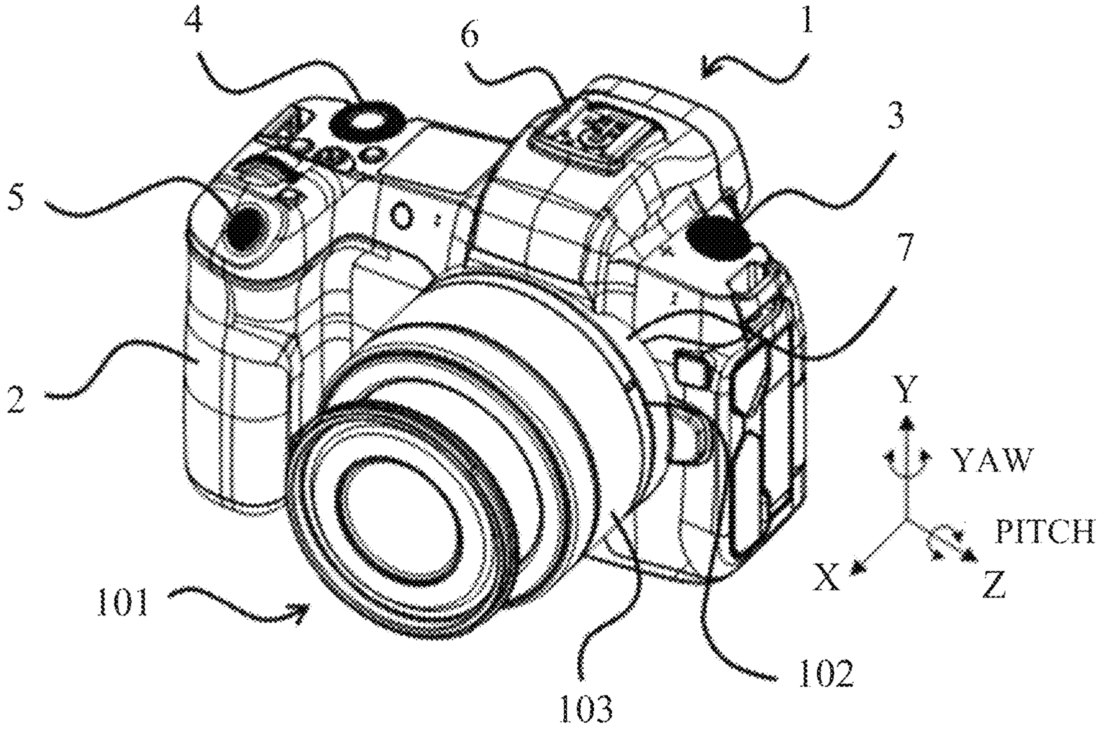
FIGS. 1A and 1B are a front perspective view and a rear perspective view of an interchangeable lens according to this embodiment and a digital camera.
Figure 1B:
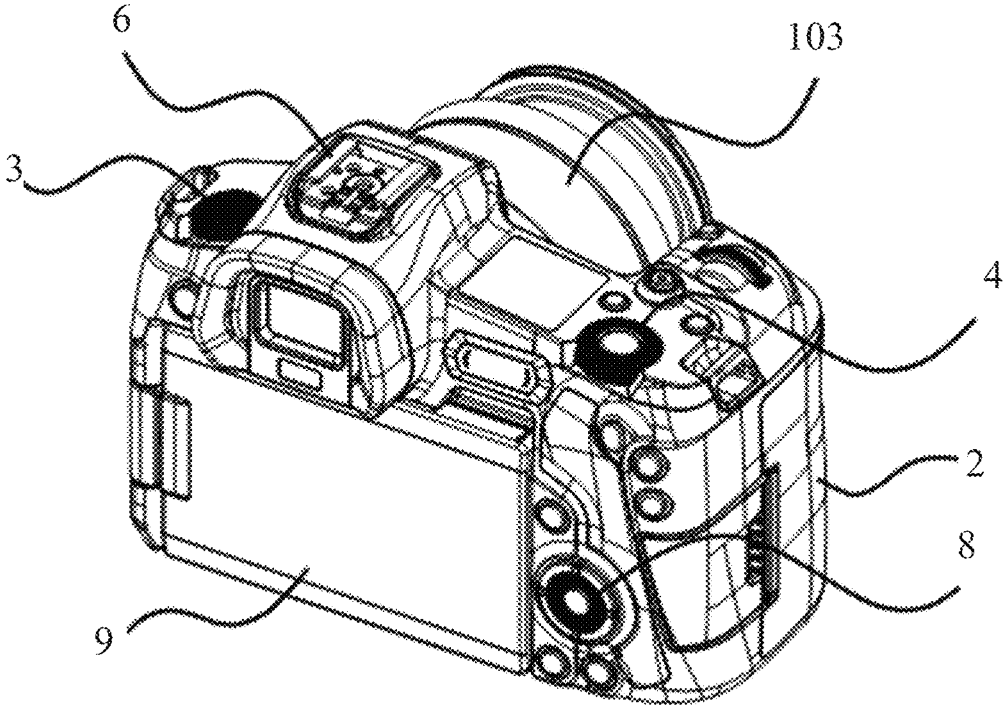

FIGS. 1A and 1B illustrate appearances of an interchangeable lens 101 as an optical apparatus according to this embodiment of the present disclosure and a digital camera (referred to as a camera body hereinafter) 1 to which the interchangeable lens 101 is detachably attached, when viewed from an oblique front side and an oblique rear side, respectively. As illustrated in FIG. 1A, an optical axis direction in which the optical axis of an imaging optical system housed in the interchangeable lens 101 extends is defined as an X-axis direction, and directions orthogonal to the optical axis direction are defined as a Z-axis direction (horizontal direction) and a Y-axis direction (vertical direction). The Z-axis and Y-axis directions will be collectively referred to as Z/Y-axis directions hereinafter. In addition, a rotational direction about the Z-axis is defined as a pitch direction, and a rotational direction about the Y-axis is defined as a yaw direction. The pitch and yaw directions (collectively referred to as pitch/yaw directions hereinafter) are rotational directions about two axes along the Z and Y-axes orthogonal to each other.

A grip portion 2 for a user to grasp the camera body 1 with a hand is provided at a left side portion of the camera body 1 when viewed from the front side (right side when viewed from the rear side). A power operation unit 3 is disposed at an upper surface portion of the camera body 1. In a case where the user operates the power operation unit 3 to power on the camera body 1 while the camera body 1 is powered off, energization is started to power on the camera body 1 and computer programs of origin detecting processing of a focus unit in the imaging optical system and the like are executed to set an imaging standby state. In a case where the user operates the power operation unit 3 to power off the camera body 1 while the camera body 1 is powered on, the camera body 1 is powered off.

A mode dial 4, a release button 5, and an accessory shoe 6 are provided at the top surface portion of the camera body 1. Imaging modes can be switched as the user rotationally operates the mode dial 4. The imaging modes include a manual still image capturing mode in which the user can arbitrarily set imaging conditions such as a shutter speed and an aperture value (F-number), an automatic still image capturing mode in which a proper exposure amount is automatically determined, and a moving image capturing mode for capturing a moving image. The user can instruct an imaging preparation operation such as autofocus (AF) or auto-exposure (AE) control by half-pressing the release button 5 (imaging preparation operation). The user can also instruct imaging by fully pressing the release button 5 (imaging instruction operation). An accessory such as an external flash is detachably attached to the accessory shoe 6.

The interchangeable lens 101 is mechanical and electrically connected to a camera mount 7 provided at the camera body 1 through a lens mount 102. The imaging optical system configured to form an object image by imaging light from an object is housed in the interchangeable lens 101. A zoom operation ring 103 that is rotatable about the optical axis by a user operation is provided at the outer circumference portion of the interchangeable lens 101. In a case where the zoom operation ring 103 is rotationally operated by the user, a zoom unit constituting the imaging optical system moves to a predetermined use position corresponding to the angle of the zoom operation ring 103. Thereby, imaging can be performed with an angle of view desired by the user.

As illustrated in FIG. 1B, a rear surface operation unit 8 and a display unit 9 are provided on the rear surface of the camera body 1. The rear surface operation unit 8 includes a plurality of buttons and dials allocated to various functions. In a case where the camera body 1 is powered on and the still or moving image capturing mode is set, the display unit 9 displays a live-view image of an object being imaged by an image sensor to be described later. The display unit 9 also displays an imaging parameter representing an imaging condition such as a shutter speed and an aperture value, and the user can change a setting value of the imaging parameter by operating the rear surface operation unit 8 while viewing the display. The rear surface operation unit 8 includes a playback button for instructing playback of a recorded captured image, and the captured image is played back and displayed on the display unit 9 in a case where the user operates the playback button.

Figure 2:
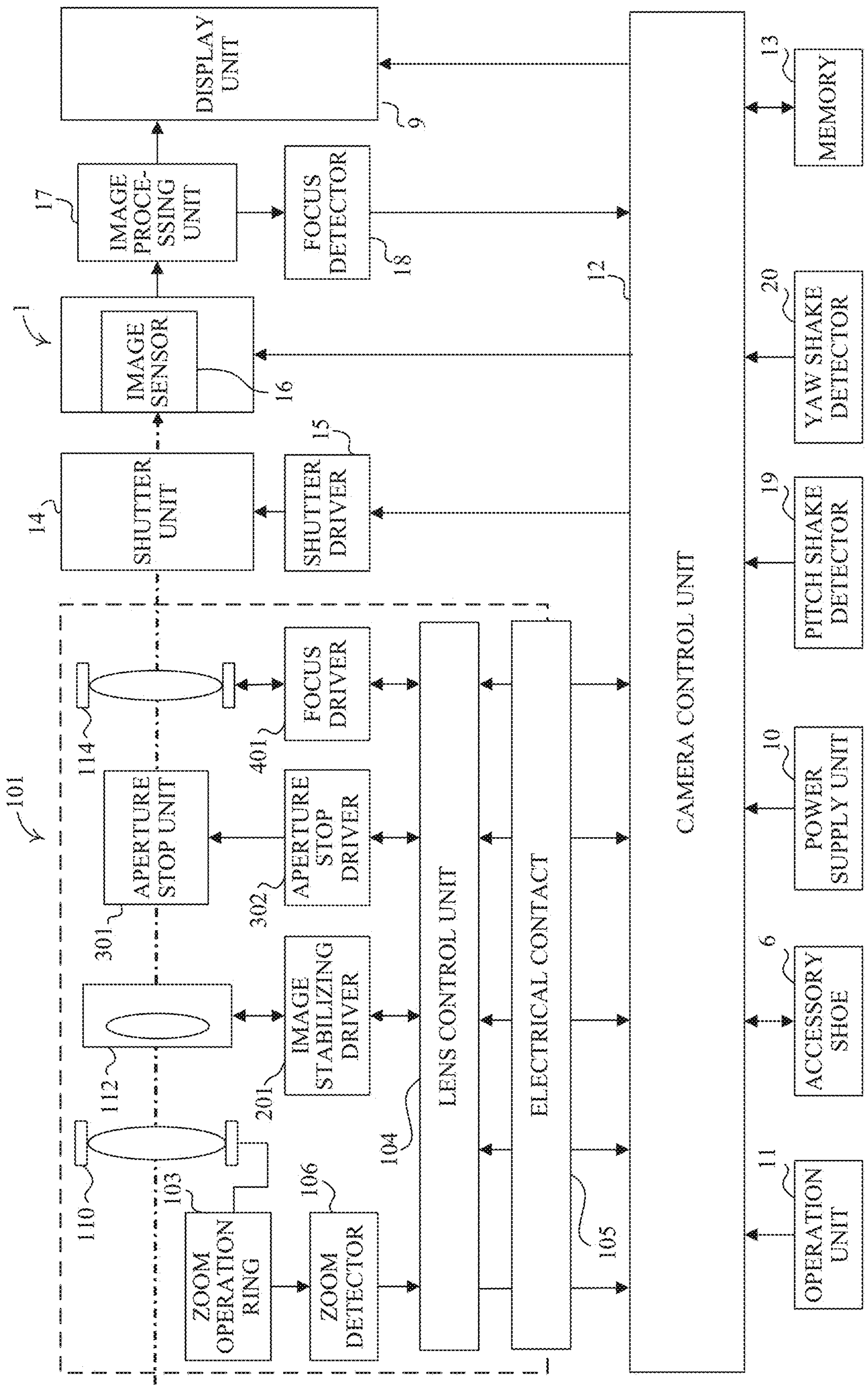
FIG. 2 is a block diagram illustrating the configuration of the interchangeable lens according to this embodiment and the digital camera.

FIG. 2 illustrates the electric and optical configurations of the interchangeable lens 101 and the camera body 1. The camera body 1 includes a power supply unit 10 configured to supply electric power to the camera body 1 and the interchangeable lens 101, the power operation unit 3, the mode dial 4, the release button 5, the rear surface operation unit 8, and an operation unit 11 including the touch panel functions of the display unit 9 described above. Control of the camera body 1 and the interchangeable lens 101 as the entire system is performed through the cooperation between a camera control unit 12 provided to the camera body 1 and a lens control unit 104 provided to the interchangeable lens 101. The camera control unit 12 reads and executes a computer program stored in a memory 13. At that time, the camera control unit 12 communicates various kinds of control signals, data, and the like with the lens control unit 104 through a communication terminal of an electrical contact 105 provided to the lens mount 102. The electrical contact 105 includes a power terminal through which electric power from the power supply unit 10 is supplied to the interchangeable lens 101.

The imaging optical system constituting the interchangeable lens 101 includes a zoom unit 110 coupled to the zoom operation ring 103 and configured to move in the optical axis direction to change the angle of view (focal length), and a lens image-stabilizing unit 112 including a shift lens as an image stabilization element. The lens image-stabilizing unit 112 reduces image blur by moving (shifting) in the Z/Y-axis directions orthogonal to the optical axis in accordance with camera shake such as manual shake. The imaging optical system further includes an aperture stop unit 301 configured to perform a light amount adjusting operation, and a focus unit 114 configured to move in the optical axis direction for focusing. The interchangeable lens 101 includes an image stabilizing driver 201 configured to move the lens image-stabilizing unit 112, an aperture stop driver 302 configured to drive the aperture stop unit 301, and a focus driver 401 configured to drive the focus unit 114.

The camera body 1 includes a shutter unit 14, a shutter driver 15, an image sensor 16, an image processing unit 17, and the camera control unit 12. The shutter unit 14 controls an exposure amount of the image sensor 16 to light from the imaging optical system. The image sensor 16 photoelectrically converts (captures) an object image formed through the imaging optical system and outputs an imaging signal. The image processing unit 17 performs various kinds of image processing for the imaging signal, and generates an image signal. The display unit 9 displays the image signal (live-view image) output from the image processing unit 17, displays the imaging parameter as described above, or plays back and displays a captured image recorded in the memory 13 or an unillustrated recording medium.

The camera control unit 12 controls the focus driver 401 in accordance with the imaging preparation operation through the operation unit 11. For example, in a case where AF is instructed, a focus detector 18 determines a focus state of an object image formed on the image sensor 16 based on an image signal generated by the image processing unit 17, generates a focus signal indicating the focus state, and transmits the focus signal to the camera control unit 12. The focus driver 401 transmits information on the current position (focus position) of the focus unit 114 to the camera control unit 12. The camera control unit 12 calculates a focus drive amount based on the focus state and the current focus position and transmits the focus drive amount to the lens control unit 104. The lens control unit 104 moves the focus unit 114 to an in-focus position by driving a focus motor in the focus driver 401 in accordance with the focus drive amount, thereby obtaining an in-focus state on an object. The focus motor may be a stepping motor, a DC motor, or a vibration motor.

The camera control unit 12 further controls the aperture stop driver 302 and the shutter driver 15 in accordance with an aperture value and a shutter speed that are input by the user through the operation unit 11, thereby driving the aperture stop unit 301 to the input aperture value and driving the shutter unit 14 at the input shutter speed.

The camera body 1 includes a pitch shake detector 19 and a yaw shake detector 20 configured to detect camera shake in the pitch direction and the yaw direction, respectively. Each of the pitch shake detector 19 and the yaw shake detector 20 includes an angular velocity sensor (vibration gyro) or an angle acceleration sensor. The camera control unit 12 calculates a shift position of the lens image-stabilizing unit 112 in the Y-axis direction using a shake signal from the pitch shake detector 19, and a shift position of the lens image-stabilizing unit 112 in the Z-axis direction using a shake signal from the yaw shake detector 20. Then, the camera control unit 12 controls the image stabilizing driver 201 in accordance with the calculated shift positions in the pitch/yaw directions, thereby moving the lens image-stabilizing unit 112 to a target position in the Z/Y-axis directions to reduce image blur.

The interchangeable lens 101 includes the zoom operation ring 103 for changing an angle of view of the imaging optical system, and a zoom detector 106 configured to detect the angle of the zoom operation ring 103. The zoom detector 106 includes a linear potentiometer or the like and detects, as an absolute value, the angle of the zoom operation ring 103 being operated by the user. Information on the angle of view detected by the zoom detector 106 is transmitted to the lens control unit 104 and reflected onto various kinds of control by the camera control unit 12. Part of various kinds of information is recorded in the memory 13 or an unillustrated recording medium together with a captured image.

Figure 3:
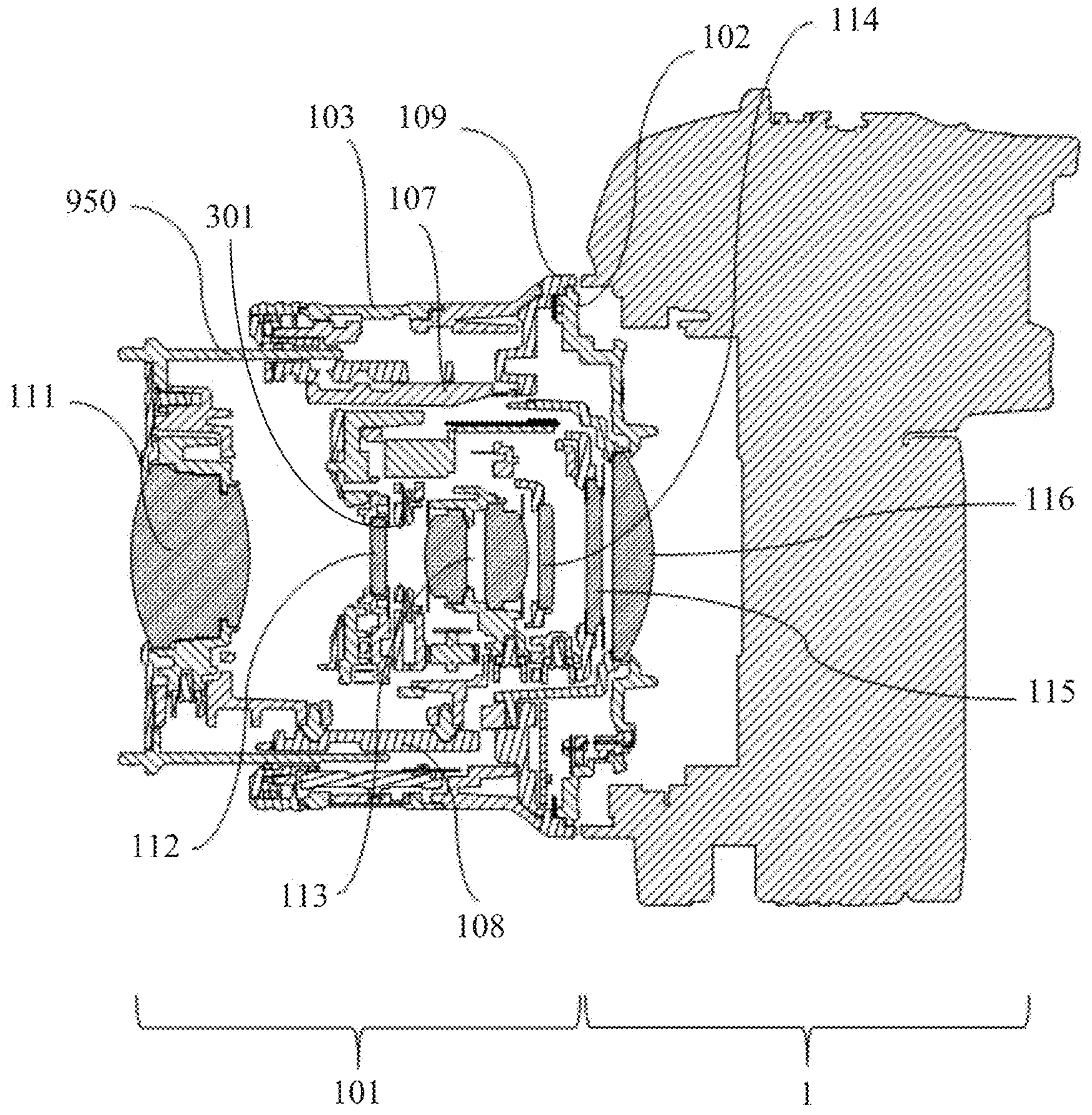
FIG. 3 is a sectional view of the interchangeable lens according to this embodiment at a telephoto end.
Figure 4:
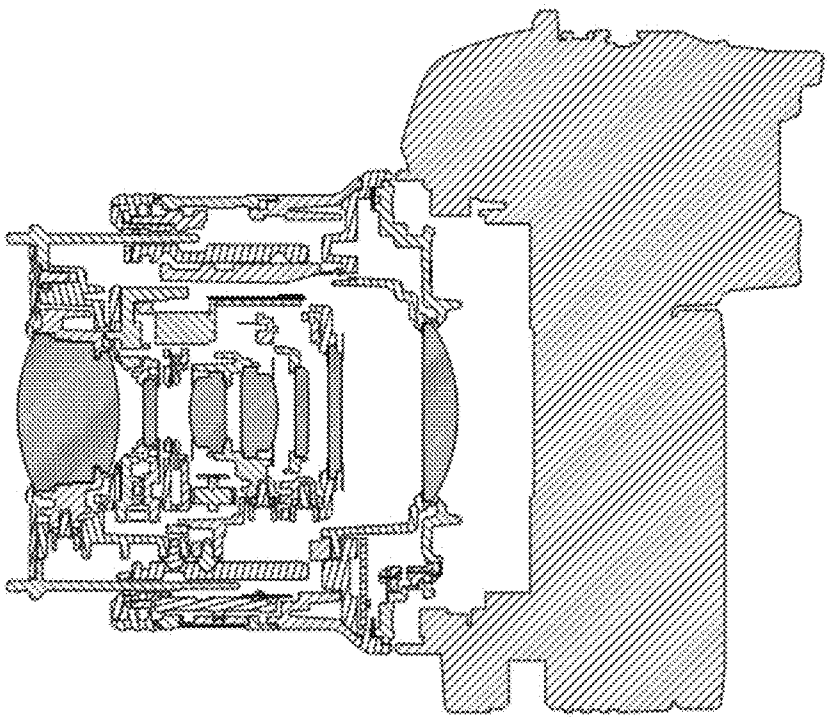
FIG. 4 is a sectional view of the interchangeable lens according to this embodiment at a wide-angle end.
Figure 5:
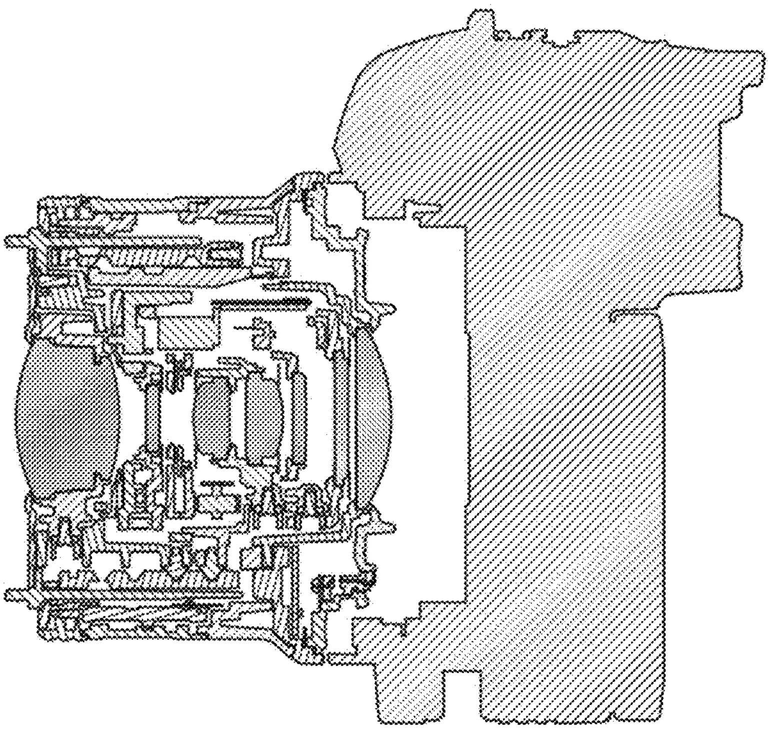
FIG. 5 is a sectional view of the interchangeable lens according to this embodiment in a housed state.
Figure 6:
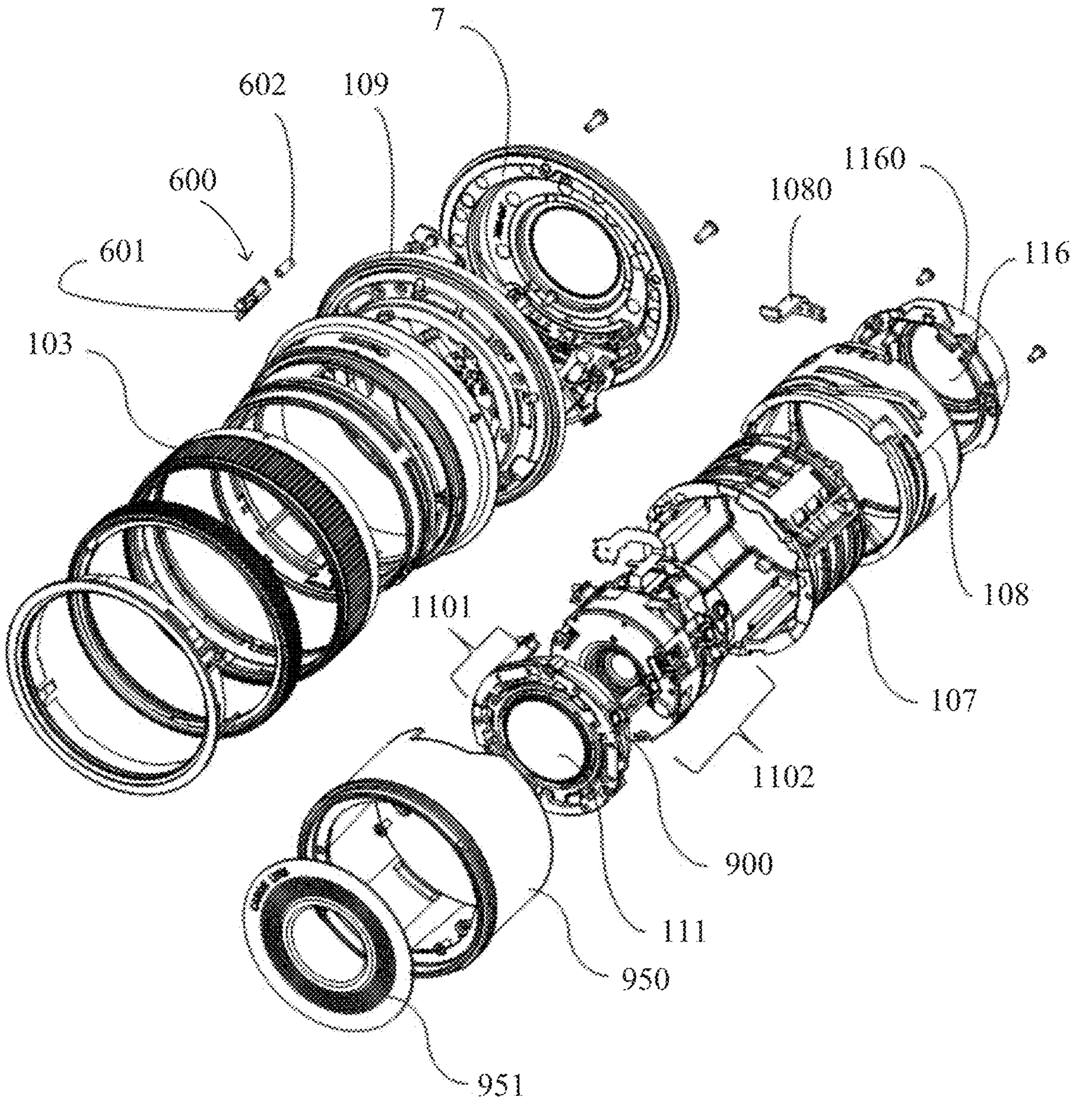
FIG. 6 is an exploded perspective view of the interchangeable lens according to this embodiment.
Figure 7:
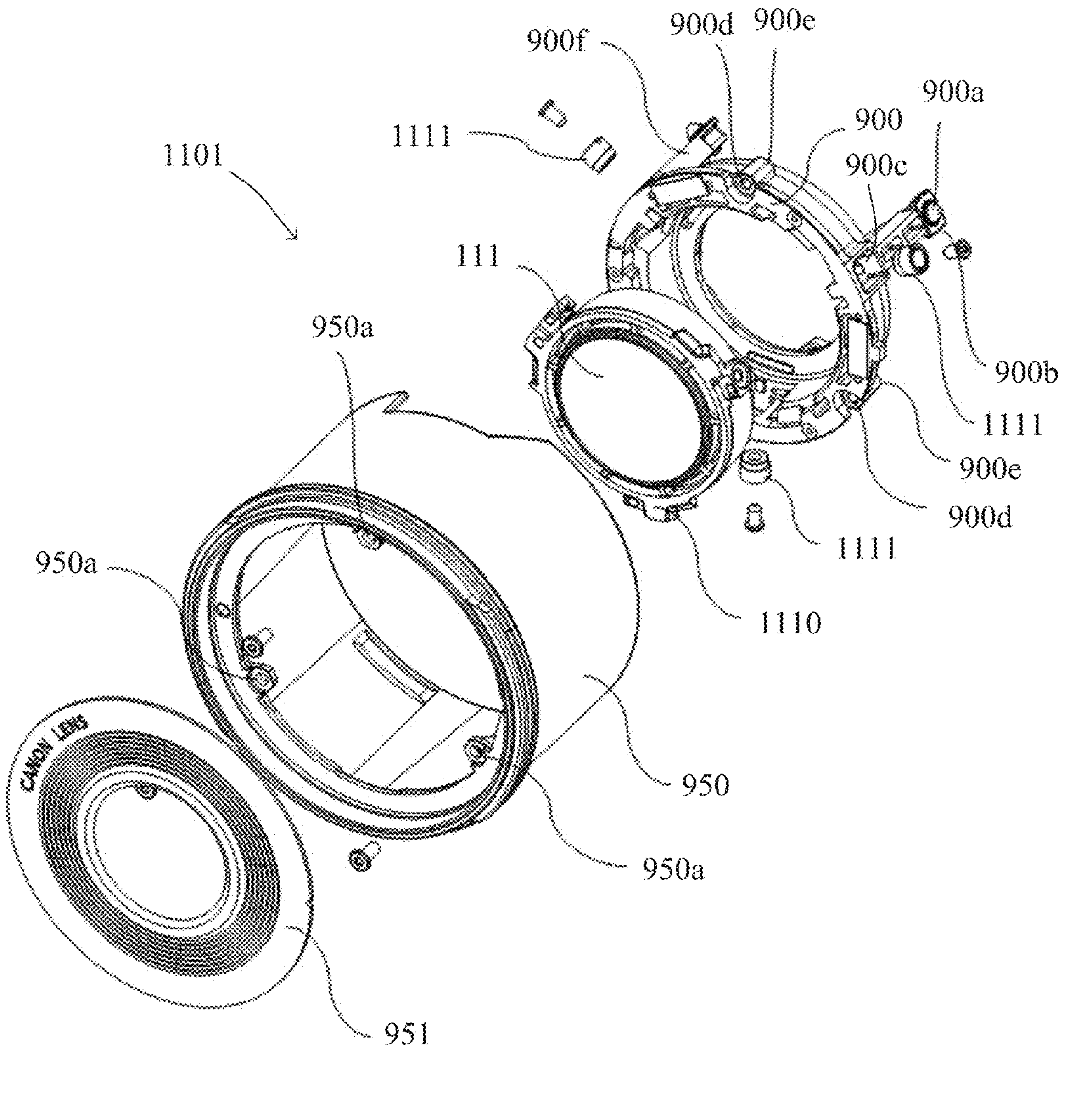
FIG. 7 is an exploded perspective view of a first zoom unit and a linear barrel according to this embodiment.
Figure 8:
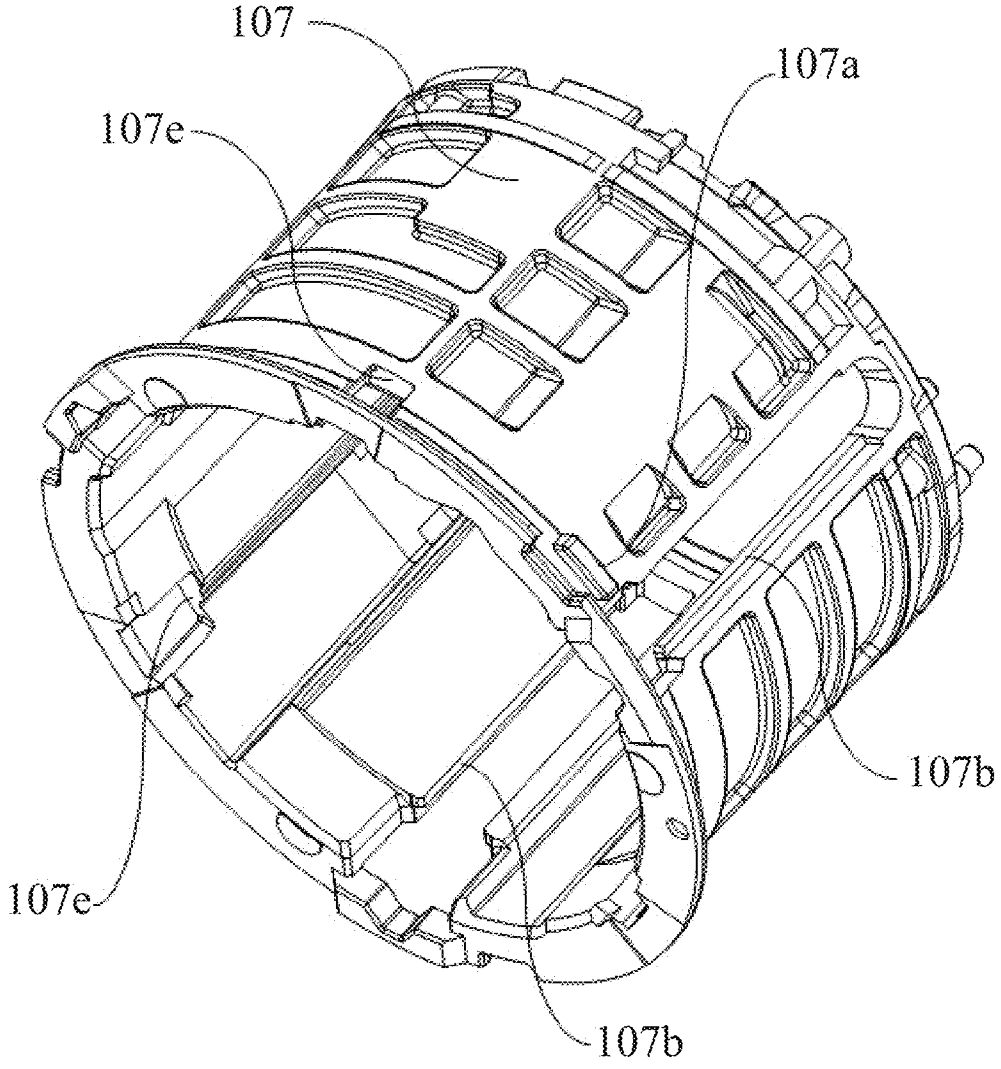
FIG. 8 is a perspective view of a guide barrel according to this embodiment.
Figure 9:
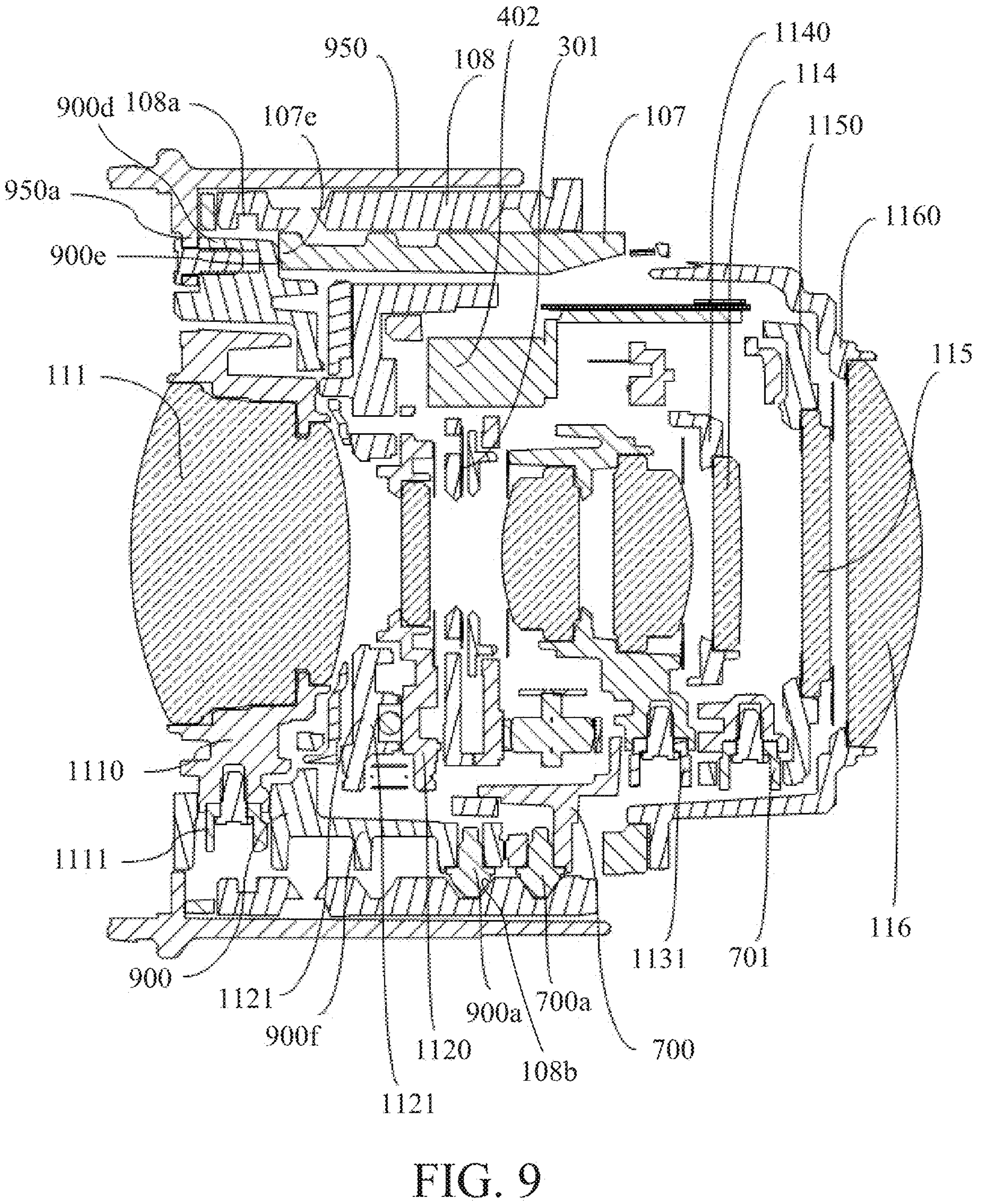
FIG. 9 is a sectional view of the interchangeable lens according to this embodiment.
Figure 10:
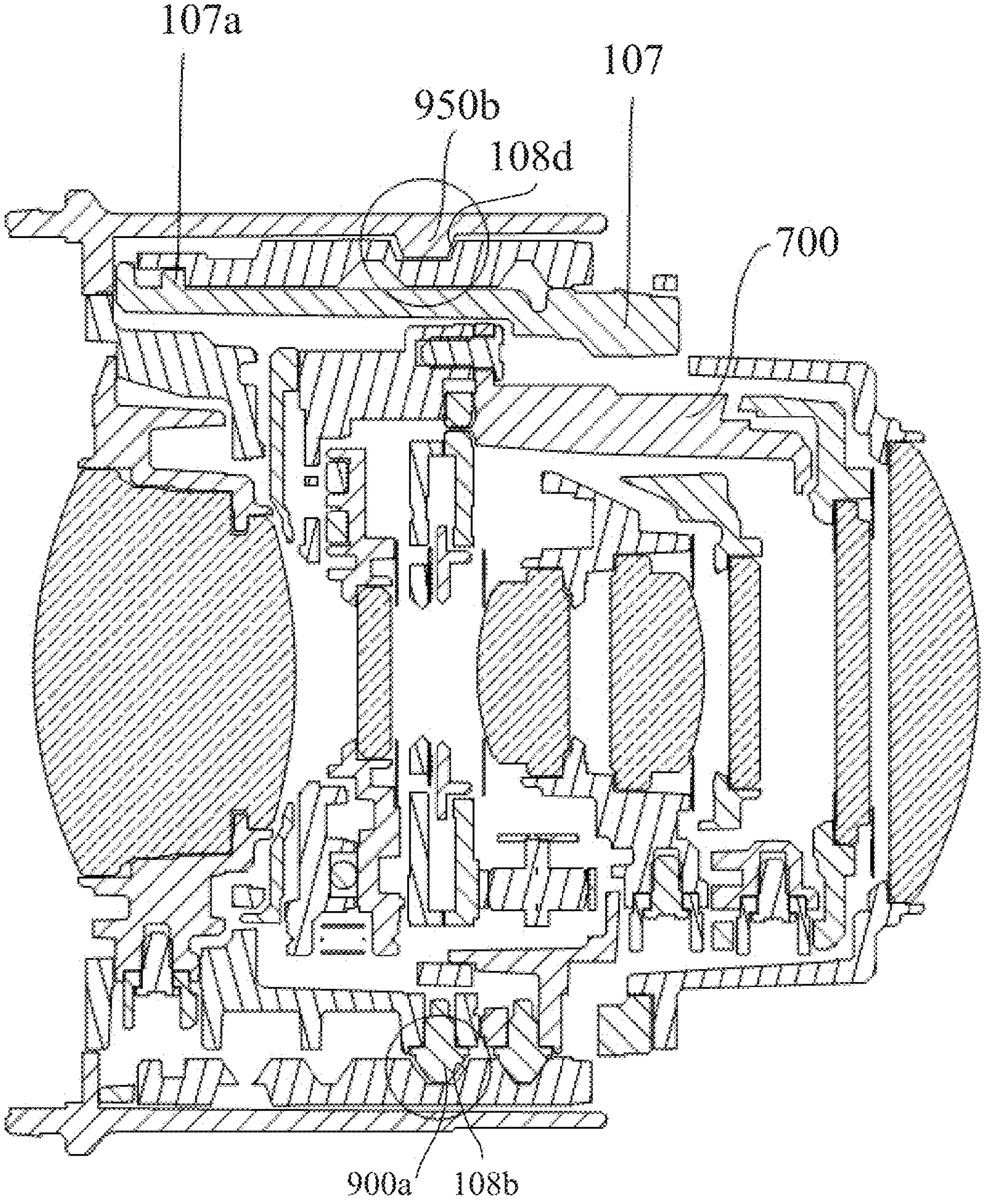
FIG. 10 is another sectional view of the interchangeable lens according to this embodiment.
Figure 11A:
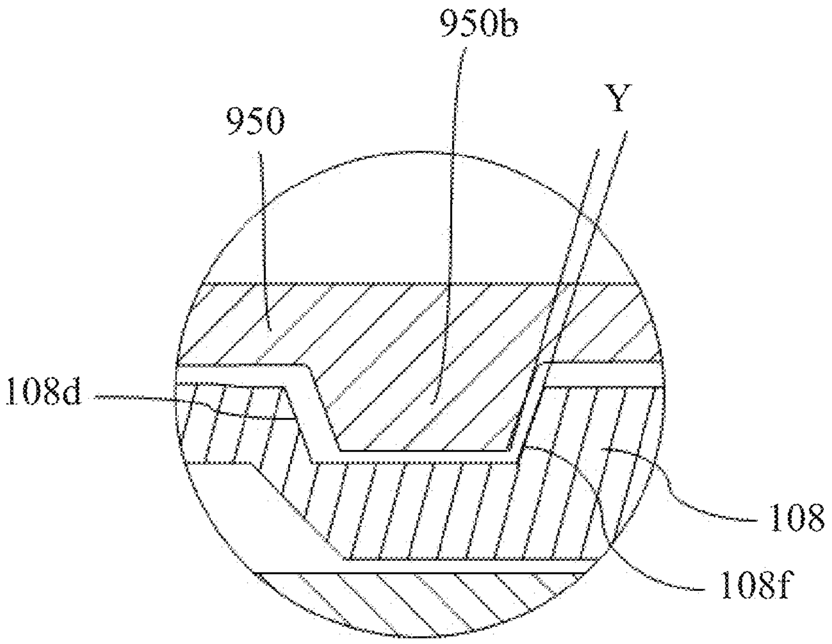
FIGS. 11A and 11B are enlarged views illustrating part of FIG. 10.
Figure 11B:
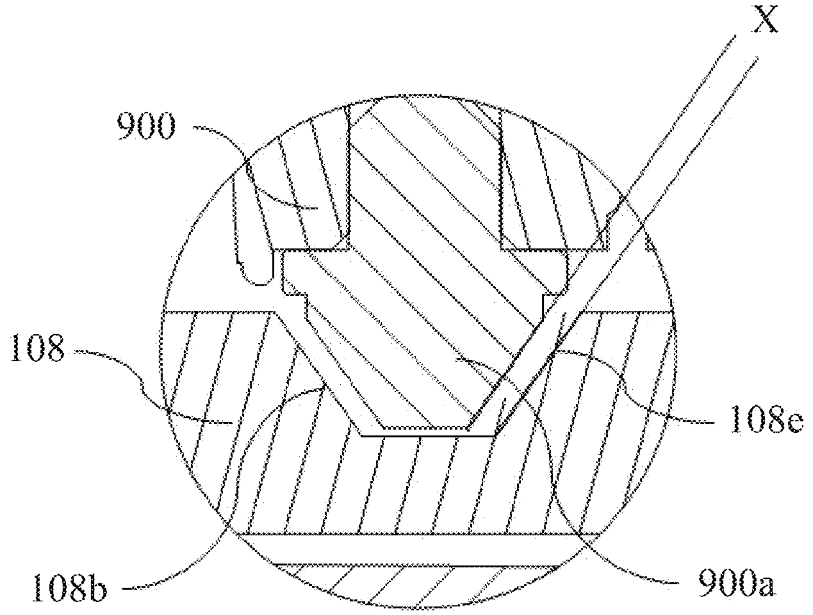
Figure 12:
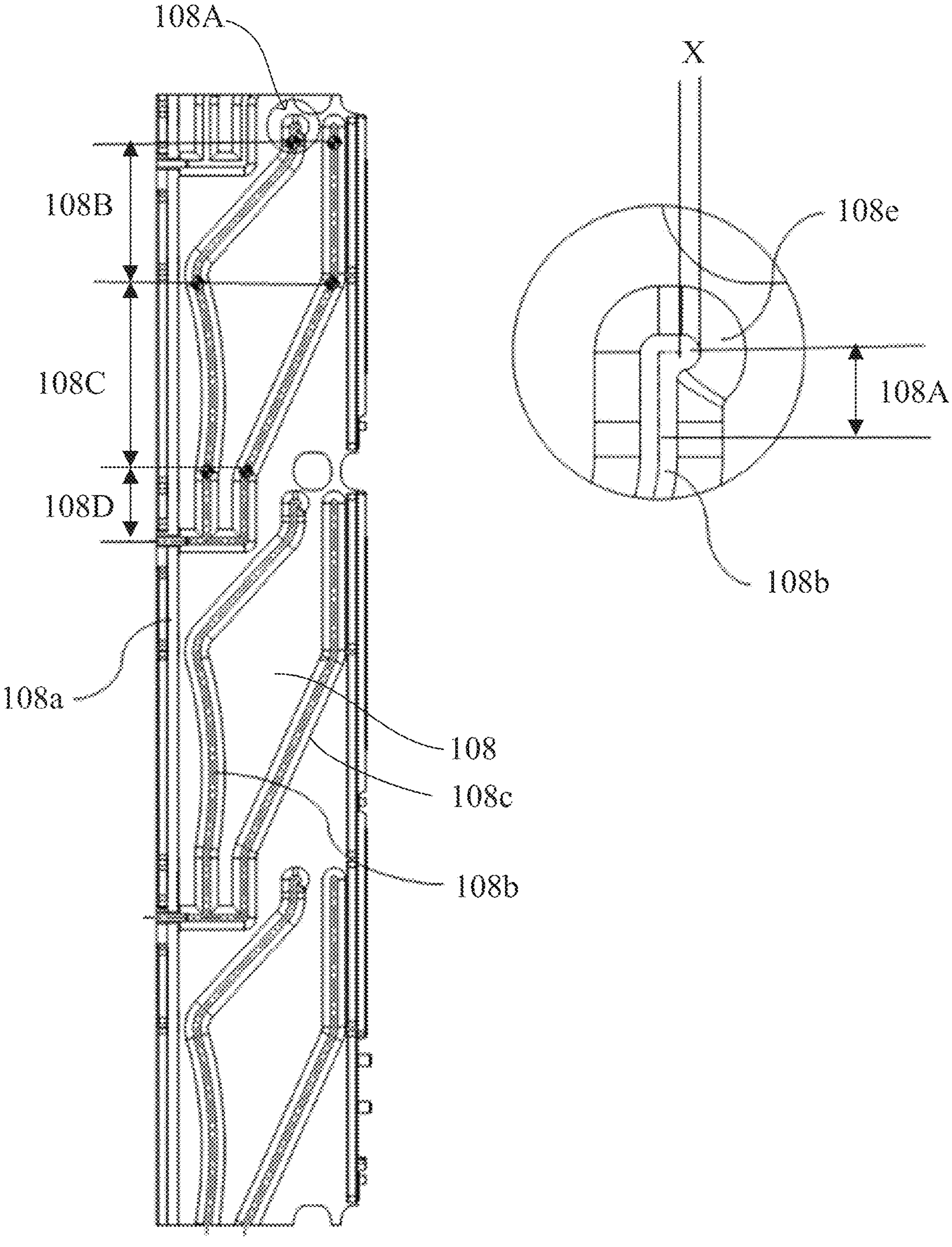
FIG. 12 is a developed view on the inner diameter side of a cam ring according to this embodiment.
Figure 13:
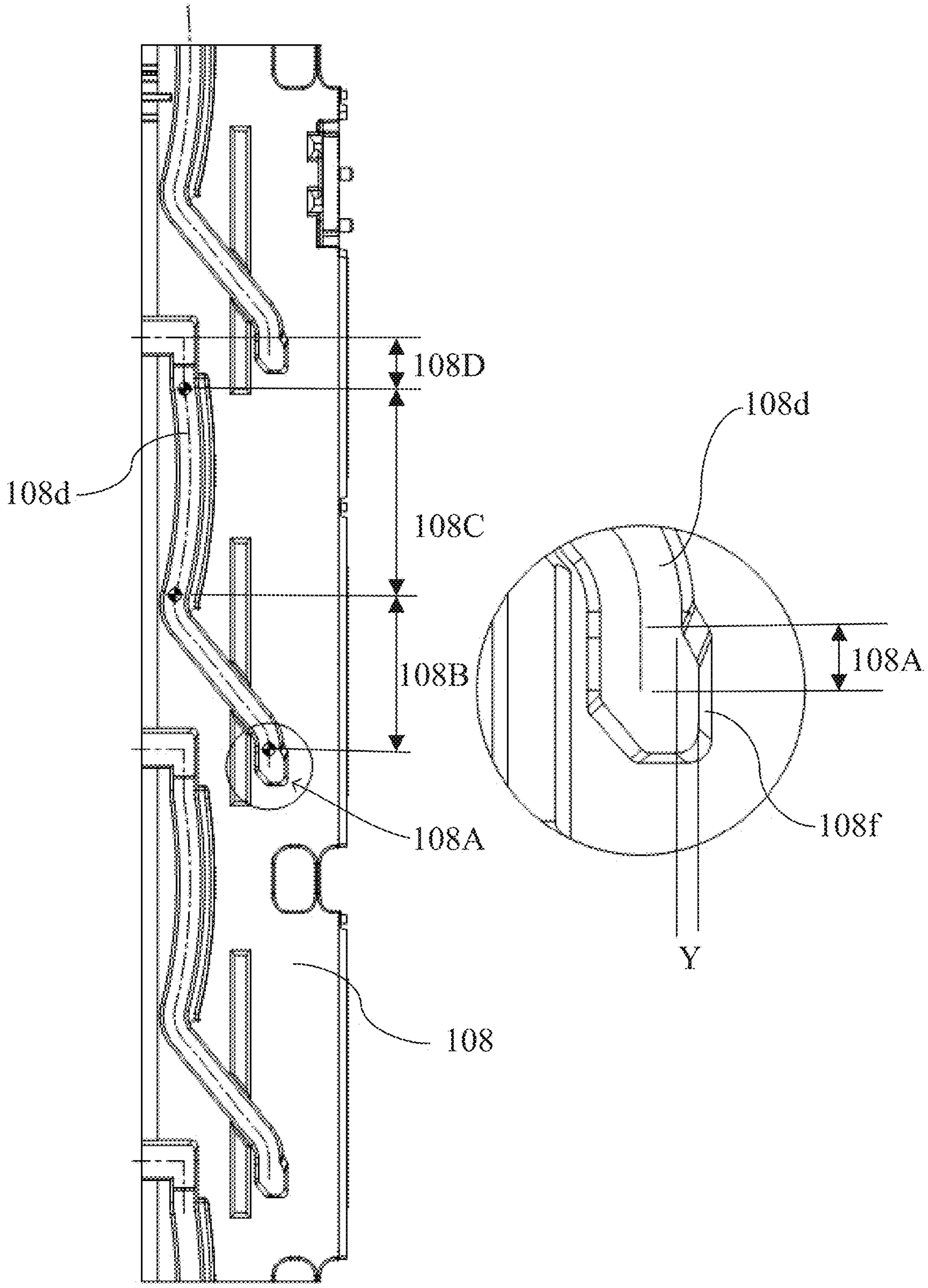
FIG. 13 is a developed view on the outer diameter side of the cam ring according to this embodiment.

Referring now to FIGS. 3 to 13, a description will be given of the configuration of the interchangeable lens 101. FIGS. 3 to 5 illustrate the interchangeable lens 101 (and the camera body 1) on the XY section including the optical axis. FIGS. 3 and 4 illustrate the section of the interchangeable lens 101 at a telephoto end and a wide-angle end, respectively. FIG. 5 illustrates the section of the interchangeable lens 101 in a housed state (non-imaging state) that provides the shortest overall length in the optical axis direction. FIG. 6 is an exploded view of the interchangeable lens 101, and FIG. 7 is an exploded view of a first lens unit 111 and a linear barrel 950 to be described later. FIG. 8 illustrates a guide barrel 107 to be described later. FIGS. 9 and 10 illustrate detailed sections of the interchangeable lens 101. FIGS. 11A and 11B are enlarged views illustrating parts of the linear barrel 950, a cam ring 108, and a first zoom base plate 900 to be described later. FIGS. 12 and 13 are developed views in a circumferential direction (direction about the optical axis) centered at the optical axis, illustrating inner and outer circumference portions, respectively, of the cam ring 108 to be described later.

This embodiment uses an optical system of a six-unit configuration as the imaging optical system, as illustrated in FIGS. 3 and 4. The imaging optical system includes, in order from an object side to an image side, the first lens unit 111, the lens image-stabilizing unit 112 as a second lens unit, the aperture stop unit 301, a third lens unit 113, a fourth lens unit 114 as a focus unit, a fifth lens unit 115, and a sixth lens unit 116. The sixth lens unit 116 is directly fixed to the guide barrel 107. The zoom unit 110 illustrated in FIG. 2 includes a first zoom unit including the first lens unit 111, and a second zoom unit including the second to fifth lens units 112 to 115, and they independently move in the optical axis direction. The imaging optical system may have a unit configuration other than the above unit configuration.

The guide barrel 107 as a guide member is a fixed member disposed at the outer circumference of the imaging optical system and fixed to the lens mount 102 through a fixed barrel 109. The lens mount 102 is a member mechanically and electrically engaged with a camera mount of the camera body 1. As illustrated in FIG. 8, engagement tabs 107*a* are formed at a plurality of equally spaced circumferential locations of an outer circumference portion of the guide barrel 107. The guide barrel 107 holds the cam ring 108 as a cam member rotatably about the optical axis on its outer circumferential surface.

As illustrated in FIG. 9, an engagement groove portion 108*a* is provided on the inner circumference side of the cam ring 108. The cam ring 108 is coupled to the zoom operation ring 103 through an unillustrated key. As the zoom operation ring 103 is rotationally operated by the user, the cam ring 108 rotates about the optical axis due to engagement between the engagement tabs 107*a* and the engagement groove portion 108*a*.

As illustrated in FIG. 6, the first lens unit 111 constituting the first zoom unit is included in a first zoom unit 1101, and the second to fifth lens units 112 to 115 constituting the second zoom unit are included in a second zoom unit 1102.

As illustrated in FIG. 8, linear groove portions 107*b* that guide movement of the first zoom unit 1101 and the second zoom unit 1102 in the optical axis direction and prevent rotation about the optical axis are formed at equally spaced circumferential locations of the guide barrel 107. As illustrated in FIG. 12, each of a set of first cam groove portions 108*b* as cam portions for driving the first zoom unit 1101 in the optical axis direction and a set of second cam groove portions 108*c* as cam portions for driving the second zoom unit 1102 in the optical axis direction are formed at equally spaced circumferential locations of the cam ring 108.

As illustrated in FIG. 7, in the first zoom unit 1101, the first lens unit 111 is held by a first lens frame (lens holding frame) 1110, which is held by the first zoom base plate 900 as a movable member. The first zoom base plate 900 has linear key portions 900*b* at three equally spaced circumferential locations, and cam followers 900*a* are provided on the respective linear key portions 900*b*. The cam followers 900*a* may be integrated with the first zoom base plate 900 (linear key portions 900*b*) or may be formed as separate members and fixed to the first zoom base plate 900. Each cam follower 900*a* is engaged with a corresponding first cam groove portion 108*b* of the cam ring 108, and each linear key portion 900*b* is engaged with a corresponding linear groove portion 107*b* of the guide barrel 107. The linear key portions 900*b* are coupled to the first zoom base plate 900 by couplers 900*f* to reduce (miniaturize) the overall length of the interchangeable lens 101 in the housed state.

As described later in detail, the second zoom unit 1102 includes linear key portions and cam followers held by the linear key portions at three equally spaced circumferential locations. Each cam follower of the second zoom unit 1102 is engaged with the corresponding second cam groove portion 108*c* of the cam ring 108, and each linear key portion thereof is engaged with the corresponding linear groove portion 107*b*.

When the cam ring 108 rotates as the zoom operation ring 103 is rotationally operated by the user, the cam followers of the first and second zoom units 1101 and 1102 are pressed in the optical axis direction by the first and second cam groove portions 108*b* and 108*c*. In this case, the first and second zoom units 1101 and 1102 are guided in the optical axis direction while they are prevented from rotating about the optical axis by engagements between the linear key portions and the linear groove portions 107*b*. Thereby, the first and second zoom units 1101 and 1102 are driven in the optical axis direction.

A description will now be given of a method of holding the first lens unit 111 in the first zoom unit 1101. As illustrated in FIG. 7, the first lens unit 111 is held by a first lens frame 1110. The first lens frame 1110 is held by the first zoom base plate 900 through bayonet coupling to the first zoom base plate 900 and prevented from moving relative to the first zoom base plate 900 in the optical axis direction by the bayonet coupling.

In addition, rollers 1111 are attached by screws at three equally spaced circumferential locations of an outer circumference portion of the first lens frame 1110. Each roller 1111 is a decentered roller. The three rollers 1111 are inserted into rectangular holes 900*c* from the outside of the first zoom base plate 900 in the radial direction and fastened to the first lens frame 1110 by screws, and the rectangular holes 900*c* are provided at three equally spaced circumferential locations of the first zoom base plate 900. Rotating either roller 1111 about its axis can adjust the position of the first lens frame 1110 relative to the first zoom base plate 900 (a decentering position in a plane orthogonal to the optical axis and a tilt position relative to that plane). Since the position of the first lens frame 1110 relative to the first zoom base plate 900 is adjustable in this manner, optical performance degradation along with downsizing of the interchangeable lens 101 can be suppressed.

As understood from FIG. 9, the rollers 1111 cannot be rotated from the outside when the linear barrel 950 as an exterior member that moves integrally with the first zoom base plate 900 is attached to the first zoom base plate 900. Thus, the linear barrel 950 needs to be attached to the first zoom base plate 900 after the rollers 1111 are rotated from the outside to adjust the position of the first lens frame 1110 relative to the first zoom base plate 900.

As illustrated in FIGS. 7 and 9, the linear barrel 950 is attached by screws to fastening portions 900*d* at three circumferential locations of the first zoom base plate 900 through fastening portions 950*a* provided at three circumferential locations of a front wall portion of the linear barrel 950 on the object side. The fastening portions 950*a* and the fastening portions 900*d* are each disposed at equally spaced circumferential locations by 120° and disposed at phases different from circumferential phases where the three linear guide groove portions 107*b* are provided in the guide barrel 107 illustrated in FIG. 8.

After the linear barrel 950 is attached to the first zoom base plate 900 by screws, a front plate 951 is bonded and fixed to the front end face of the front wall portion of the linear barrel 950 by an unillustrated double-sided adhesive tape as illustrated in FIG. 7.

As illustrated in FIG. 10, convex portions 950*b* as third contact portions are provided at three equally spaced circumferential locations of an inner circumference portion of the linear barrel 950. As illustrated in FIG. 11A, each convex portion 950*b* is disposed in a third cam groove portion 108*d* provided at the outer circumference portion of the cam ring 108 with a second gap Y from a cam surface 108*f* as a fourth contact portion on a mount side (image side). In a case where external force such as the impact acts on the first zoom unit 1101 from the outside on the front side, the second gap Y is eliminated and the convex portions 950*b* contact the cam surfaces 108*f*, and thereby external force applied from the cam followers 900*a* to the first cam groove portions 108*b* (and reaction force to the cam followers 900*a*) can be reduced. Thereby, optical performance degradation due to the influence of the external force on the interchangeable lens 101 can be suppressed.

A description will now be given of the attachment of the linear barrel 950 to the first zoom base plate 900. As illustrated in FIGS. 12 and 13, the first cam groove portions 108*b* and the third cam groove portions 108*d* of the cam ring 108 have continuous groove shapes and include four areas of an assembly area 108A, a housing area 108B, an imaging area 108C, and an introduction area 108D.

The assembly area 108A includes a portion where the width of each cam groove portion in the optical axis direction is larger than in the other areas. The linear barrel 950 is attached to the first zoom base plate 900 in a case where the cam followers 900*a* provided at the first zoom base plate 900 and the convex portions 950*b* provided at the linear barrel 950 are positioned in the assembly area 108A of the first and third cam groove portions 108*b* and 108*d* of the cam ring 108. In other words, the assembly area 108A is an area for attaching (assembling) the linear barrel 950 to the first zoom base plate 900 and corresponds to a second area.

The introduction area 108D is an area opened on the object side for introducing the cam followers 900*a*, cam followers 700*a*, and the convex portions 950*b* into the first cam groove portions 108*b*, the second cam groove portions 108*c*, and the third cam groove portions 108*d* corresponding thereto. The cam followers 700*a* are provided at three equally spaced circumferential locations of a second zoom base plate 700 that is a base member of the second zoom unit 1102. Due to the introduction area 108D, it is possible to move the first zoom base plate 900, the second zoom base plate 700, and the linear barrel 950 in the optical axis direction without rotating the cam ring 108.

The housing area 108B is an area for driving the first and second zoom units 1101 and 1102 between the wide-angle end illustrated in FIG. 4 and the housed state illustrated in FIG. 5 through the cam followers 900*a* and 700*a*. The imaging area 108C is an area for driving the first and second zoom units 1101 and 1102 between the wide-angle end and the telephoto end illustrated in FIG. 3 through the cam followers 900*a* and 700*a*. The housing area 108B and the imaging area 108C correspond to a first area.

In the following description, states in which the cam followers 900*a* and the convex portions 950*b* are positioned in the assembly area 108A, the housing area 108B, and the imaging area 108C of the first and third cam groove portions 108*b* and 108*d* are described as states in which the cam ring 108 is in phases of the assembly area 108A, the housing area 108B, and the imaging area 108C, respectively.

As illustrated in FIGS. 7 and 9, first contact portions 900*e* are provided at ends of the three fastening portions 900*d* of the first zoom base plate 900 on the mount side. The linear key portions 900*b* are coupled to the couplers 900*f* on the mount side of the first contact portions 900*e* in the optical axis direction. In the guide barrel 107, three second contact portions 107*e* are provided at positions corresponding to the three first contact portions 900*e*. When the cam ring 108 is in the phase of the assembly area 108A, the first contact portions 900*e* can contact the second contact portions 107*e* as illustrated in FIG. 9.

In this state, as illustrated in FIGS. 11B, 12, and 13, a first gap X is formed between each cam follower 900*a* and a cam surface 108*e* of the corresponding first cam groove portion 108*b* on the mount side. Thus, even when force is applied on the mount side in the optical axis direction when the linear barrel 950 is attached to the first zoom base plate 900, the cam followers 900*a* in the assembly area 108A do not contact the cam surfaces 108*e* of the first cam groove portions 108*b* since the first contact portions 900*e* contact the second contact portions 107*e*.

Accordingly, no load is applied to the cam followers 900*a* or the couplers 900*f*, and thus the first zoom base plate 900 is prevented from deforming. Thereby, the size of the interchangeable lens 101 can be reduced and its optical performance degradation can be suppressed. In a case where the cam surfaces 108*e* contact the cam followers 900*a* before the first contact portions 900*e* contact the second contact portions 107*e*, the size increases due to reinforcement and dimension increase of the couplers 900*f* for preventing deformation of the first zoom base plate 900.

The first contact portions 900*e* and the second contact portions 107*e* are disposed at a tube portion of the guide barrel 107 on the inner periphery side of the cam ring 108. Thus, the size of the interchangeable lens 101 can be prevented from increasing without affecting each lens unit disposed inside the guide barrel 107. As illustrated in FIGS. 11A and 11B, in the assembly area 108A, the first gap X between each cam follower 900*a* and the corresponding cam surface 108*e* and the second gap Y between each convex portion 950*b* of the linear barrel 950 and the cam surface 108*f* of the corresponding third cam groove portion 108*d* on the mount side are set to hold X>Y.

As described above, the first contact portions 900*e* contact the second contact portions 107*e* at the attachment of the linear barrel 950 to the first zoom base plate 900. In this state, the guide barrel 107 may deform in the optical axis direction in a case where large force toward the mount side is applied by the linear barrel 950. However, even in this case, with the setting of X>Y, the convex portions 950*b* of the linear barrel 950 contact the cam surfaces 108*f* of the third cam groove portions 108*d* before the cam followers 900*a* contact the cam surfaces 108*e* of the first cam groove portions 108*b*. As a result, no load is applied to the cam followers 900*a* and optical performance degradation is unlikely to occur. In this state, a click mechanism 600 to be described later has not been attached yet.

Figure 14:
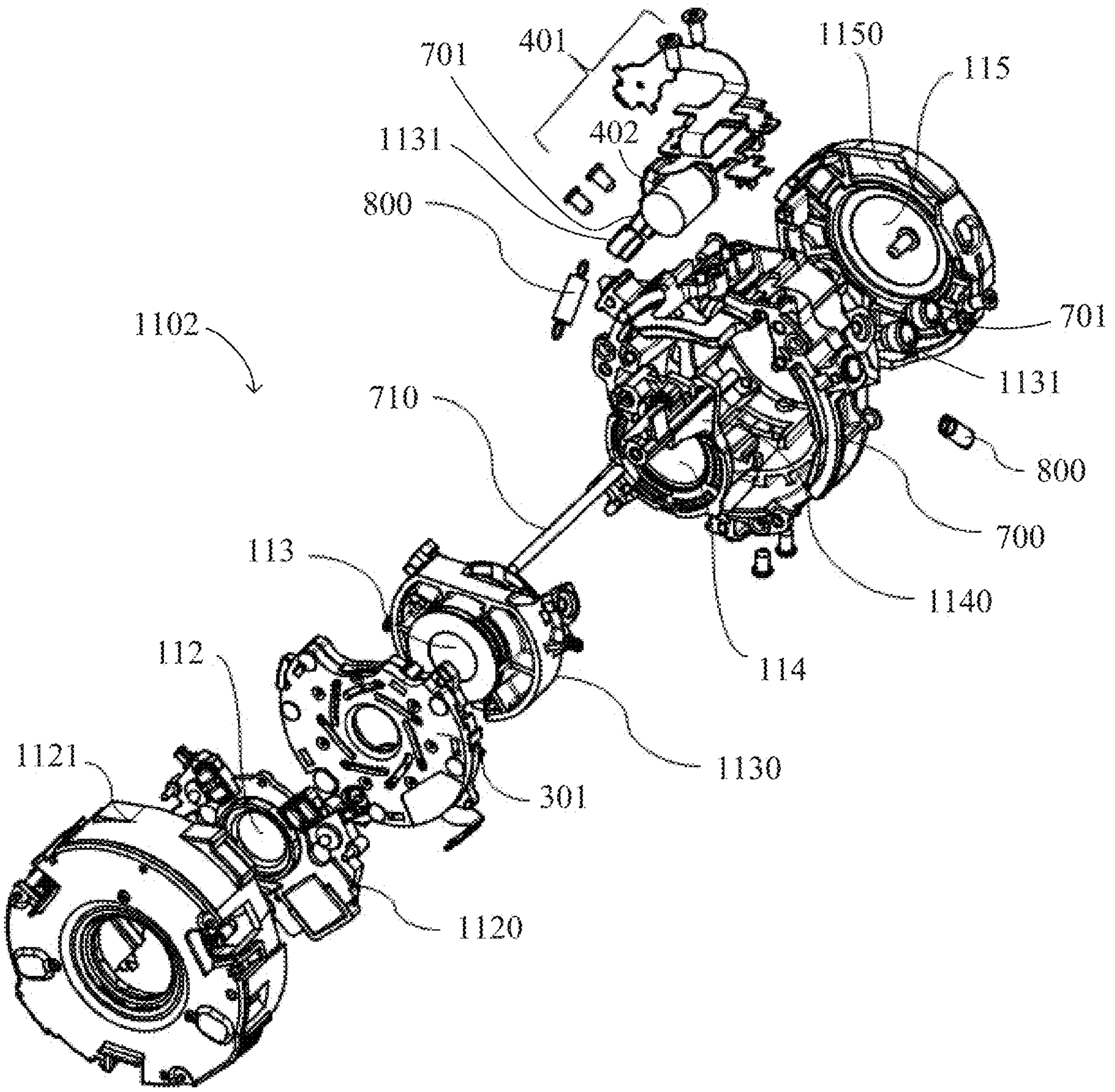
FIG. 14 is an exploded perspective view of a second zoom unit according to this embodiment.
Figure 15:
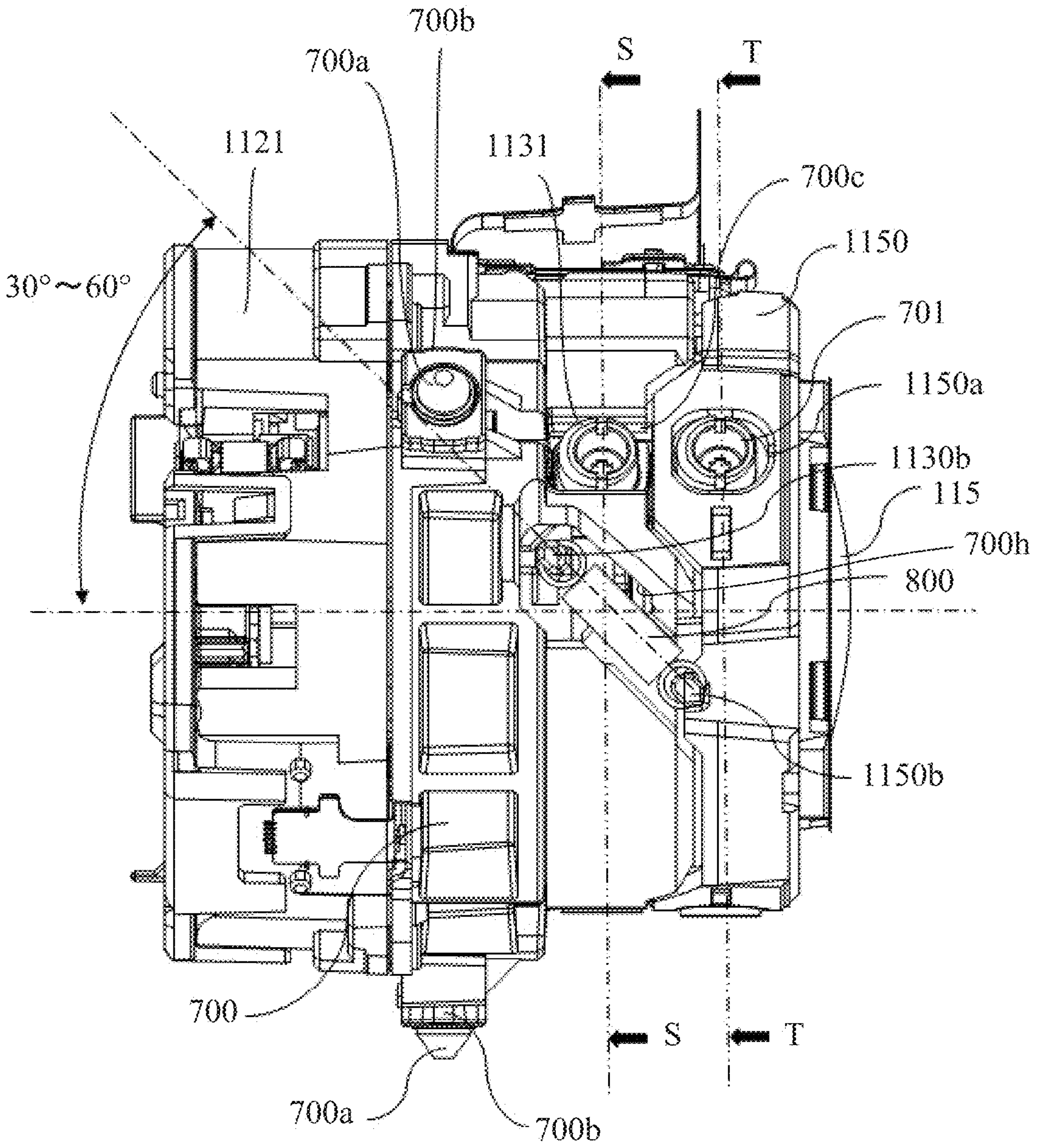
FIG. 15 is a side view of the second zoom unit according to this embodiment.

FIG. 14 is an exploded view of the second zoom unit 1102 when obliquely viewed from the object side. FIG. 15 illustrates the second zoom unit 1102 in an assembled state when viewed from a side.

In the second zoom unit 1102, the second zoom base plate 700 holds the second lens unit 112 to the fourth lens unit 114 and the aperture stop unit 301. Linear key portions 700*b* are provided at three locations in the circumferential direction at the second zoom base plate 700, and each linear key portion 700*b* holds the corresponding cam follower 700*a* described above. Each cam follower 700*a* is engaged with the corresponding second cam groove portion 108*c* of the cam ring 108, and each linear key portion 700*b* is engaged with the corresponding linear groove portion 107*b* of the guide barrel 107.

In the first zoom unit 1101 and the second zoom unit 1102, each pair of corresponding linear key portions 900*b* and 700*b* are engaged with the same linear groove portion 107*b*, thereby relatively highly accurate positioning can be realized, and optical performance degradation is less likely to occur.

In the second zoom unit 1102, the lens image-stabilizing unit 112 is held by an image stabilization lens frame 1120. The image stabilization lens frame 1120 is held by an image-stabilizing base plate 1121 movably in a plane orthogonal to the optical axis.

The image-stabilizing base plate 1121 is fixed to the second zoom base plate 700 by a plurality of screws. The aperture stop unit 301 is sandwiched between the image-stabilizing base plate 1121 and the second zoom base plate 700.

The third lens unit 113 as a first lens is held by a third lens frame 1130 as a first holder. The third lens frame 1130 is held by the second zoom base plate 700 movably in the optical axis direction and orthogonal direction the optical axis. Rollers 1131 are attached by screws to three equally spaced circumferential locations of an outer circumference portion of the third lens frame 1130. At least one of the three rollers 1131 is a decentered roller as an adjusting member. The third lens frame 1130 is bayonet-coupled to the second zoom base plate 700 with a gap that allows position adjustment. Rectangular holes 700*c* are provided at three equally spaced circumferential locations of the second zoom base plate 700. The third lens frame 1130 is held by the second zoom base plate 700 in a case where the rollers 1131 inserted into the rectangular holes 700*c* from the outside of the second zoom base plate 700 in the radial direction are fastened to the third lens frame 1130 by screws. In this case, a slight gap is formed between the second zoom base plate 700 and the third lens frame 1130 in the radial direction.

The fifth lens unit 115 as a second lens is held by a fifth lens frame 1150 as a second holder. The fifth lens frame 1150 is held by the second zoom base plate 700 movably in the optical axis direction and orthogonal direction the optical axis. Rectangular holes 1150*a* are provided at three equally spaced circumferential locations of the fifth lens frame 1150. The fifth lens frame 1150 is held by the second zoom base plate 700 in a case where rollers 701 inserted into the rectangular holes 1150*a* from the outside of the fifth lens frame 1150 in the radial direction are fastened to the second zoom base plate 700 by screws. In this case, a slight gap is formed between the second zoom base plate 700 and the fifth lens frame 1150 in the radial direction. Two of the three rollers 701 are decentered rollers as adjusting members.

Rotating the rollers 1131 and 701 as decentered rollers around their axes can adjust the positions (decentering positions in a plane orthogonal to the optical axis) of the third lens frame 1130 and the fifth lens frame 1150 relative to the second zoom base plate 700. Alternatively, through rotation of the decentered rollers, tilt positions relative to a plane orthogonal to the optical axis may be adjustable as the positions of the third lens frame 1130 and the fifth lens frame 1150. Thus, making adjustable the positions of the third and fifth lens units 113 and 115 relative to the second zoom base plate 700 can suppress optical performance degradation along with downsizing of the interchangeable lens 101.

The fourth lens unit 114 (third lens) is held by a fourth lens frame 1140 as a third holder. The second zoom base plate 700 and the image-stabilizing base plate 1121 hold a first guide shaft 710 extending in the optical axis direction, and the second zoom base plate 700 holds an unillustrated second guide shaft extending in the optical axis direction. The fourth lens frame 1140 is held by the first guide shaft 710 and the second guide shaft movably in the optical axis direction in an area sandwiched between the third lens frame 1130 and the fifth lens frame 1150 in the second zoom base plate 700. A focus motor 402 as an actuator configured to drive the fourth lens frame 1140 in the optical axis direction and the focus driver 401 including a flexible substrate (flexible printed circuit: FPC) configured to energize the focus motor 402 are fixed to the second zoom base plate 700. The focus motor 402 is disposed inside the second zoom base plate 700, and the flexible substrate is disposed outside the second zoom base plate 700.

Two pairs of hook portions 1130*b* and 1150*b* are provided at two locations of each of the outer circumference portions of the third lens frame 1130 and the fifth lens frame 1150, and respective ends of an elastic member 800 that is a tension coil spring are attached to the hook portions 1130*b* and 1150*b* of each pair.

Figure 16:
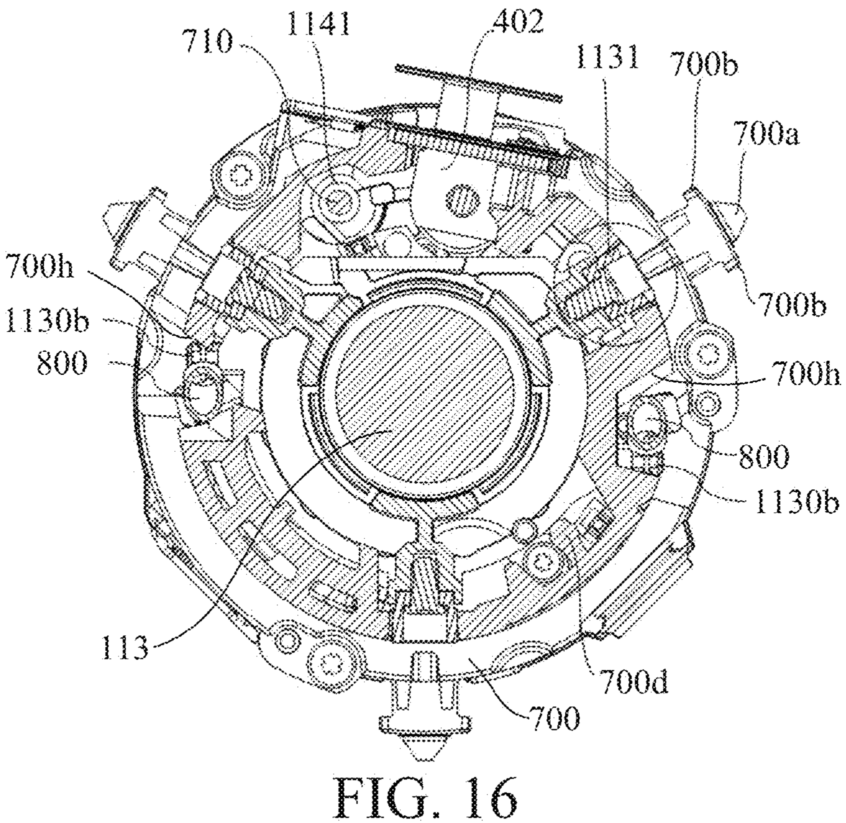
FIG. 16 is a sectional view taken along line S-S in FIG. 14.
Figure 17:
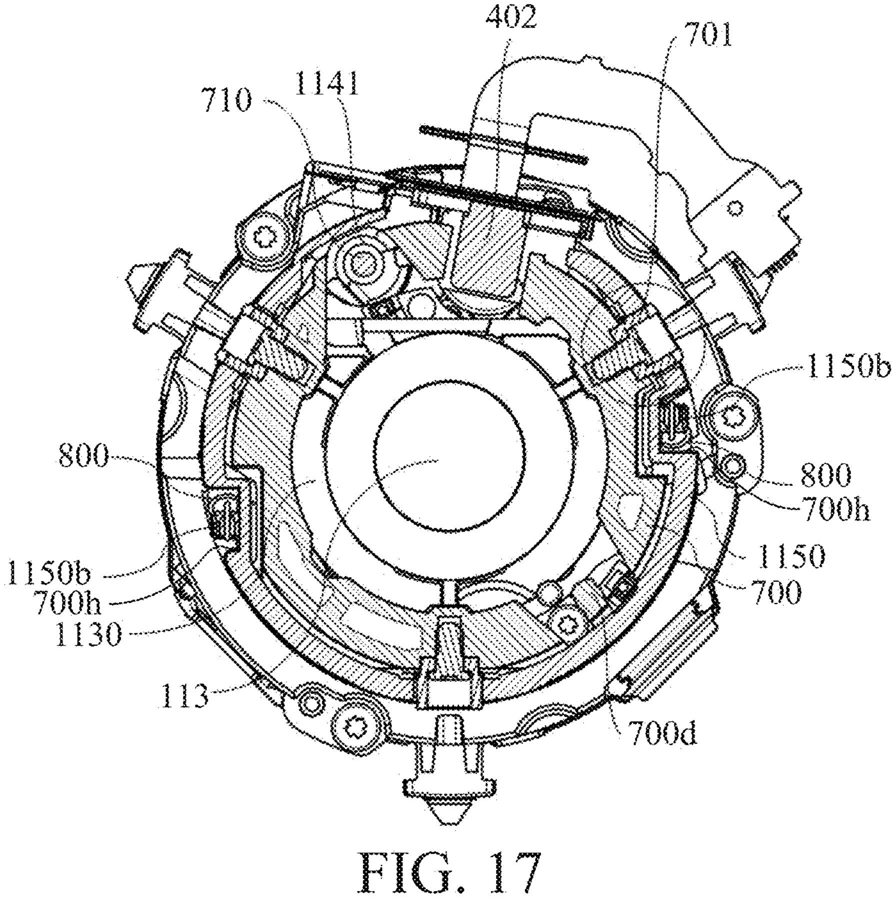
FIG. 17 is a sectional view taken along line T-T in FIG. 14.

FIG. 16 illustrates a section of the second zoom unit 1102 taken along line S-S in FIG. 15 when viewed from the image side. FIG. 17 illustrates a section of the second zoom unit 1102 taken along line T-T in FIG. 15 when viewed from the image side. As illustrated in FIGS. 16 and 17, the two pairs of hook portions 1130*b* and 1150*b* (in other words, two elastic members 800) are provided in two of three phase areas between the three pairs of rollers 1131 and 701 attached to the third lens frame 1130 and the fifth lens frame 1150. The focus driver 401 is disposed in the one remaining phase area of the second zoom base plate 700 other than the two phase areas in which the elastic members 800 are disposed. Due to this configuration, the diameter of the second zoom unit 1102 can be smaller than that in a case where the focus driver 401 is disposed in the same phase area as an elastic member 800 so as to avoid the elastic member 800.

As illustrated in FIG. 15, the pairs of hook portions 1130*b* and 1150*b* are provided in phases different from each other, and the elastic members 800 are disposed and tilted relative to the optical axis direction. The elastic members 800 biases the third lens frame 1130 and the fifth lens frame 1150 so that they approach each other in the optical axis direction and biases the third lens frame 1130 and the fifth lens frame 1150 in opposite circumferential directions.

Figure 18A:
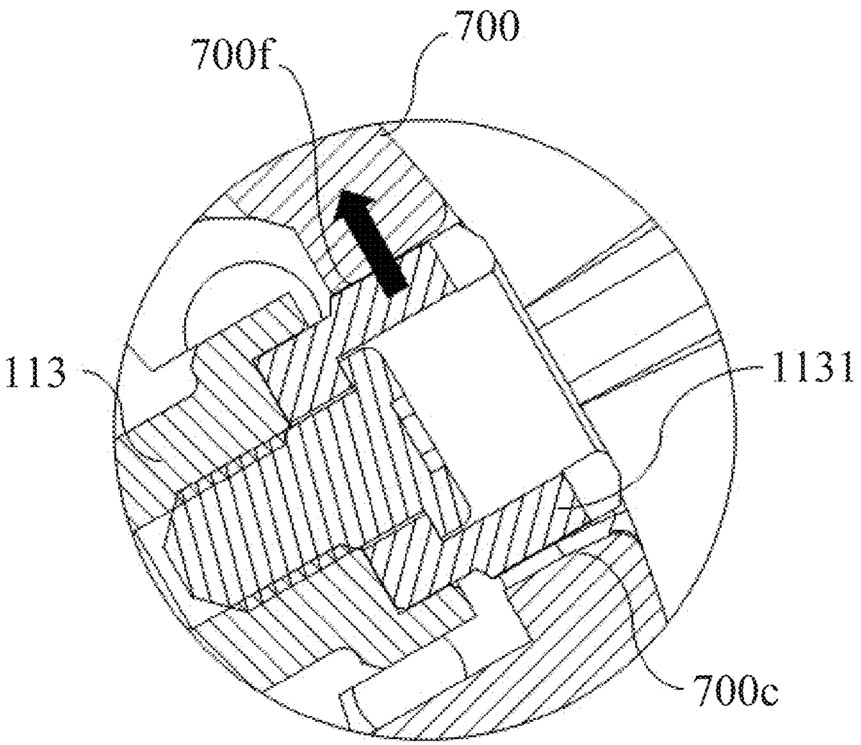
FIGS. 18A and 18B are a partially enlarged diagram of FIG. 15 and a partially enlarged diagram of FIG. 16.
Figure 18B:
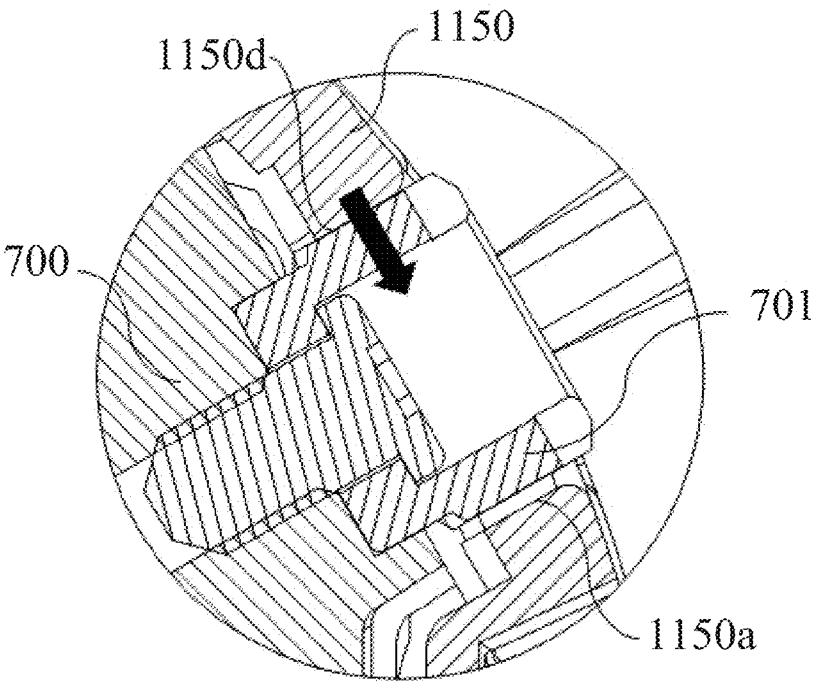
Figure 19:
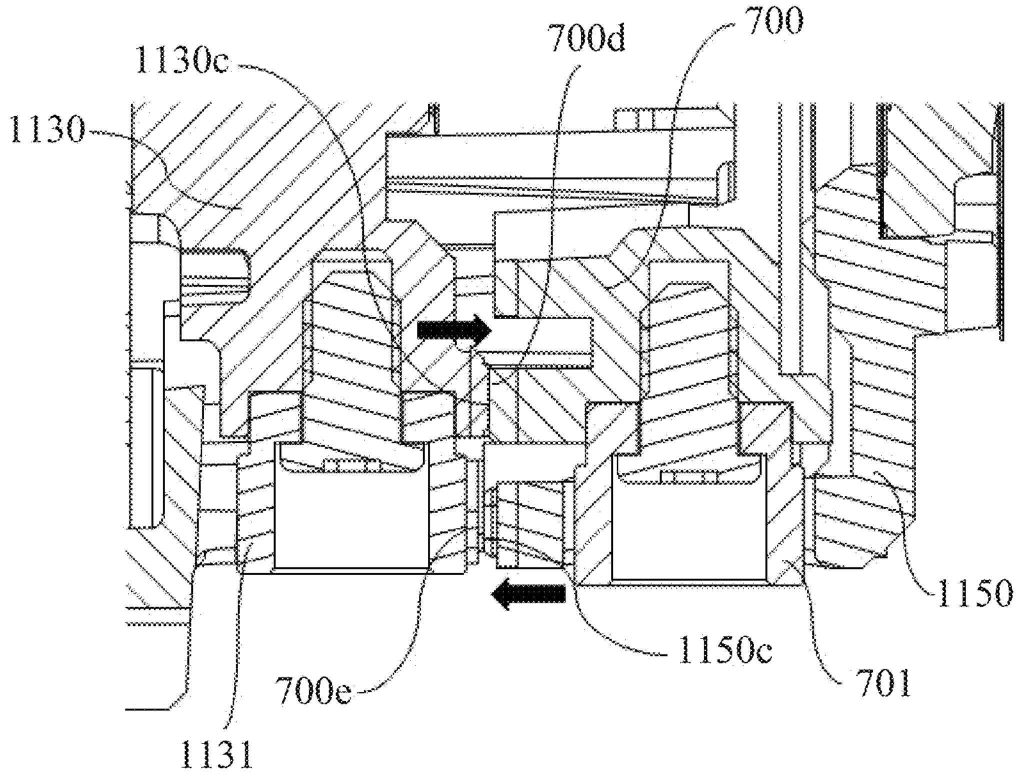
FIG. 19 is an enlarged view of a roller portion in FIG. 8.

FIG. 18A is an enlarged view around a roller 1131, as enclosed by a circle in FIG. 16, and FIG. 18B is an enlarged view around a roller 701, as enclosed by a circle in FIG. 17. FIG. 19 illustrates a section around the rollers 1131 and 701 in the second zoom unit 1102 when viewed from the side.

As illustrated in FIGS. 16, 17, and 19, the second zoom base plate 700 includes a first contact portion 700*d* facing the object side. As illustrated in FIG. 19, the second zoom base plate 700 further includes a second contact portion 700*e* facing the image side.

As illustrated in FIG. 19, a contact portion 1130*c* provided at the third lens frame 1130 contacts (by pressing) the first contact portion 700*d* of the second zoom base plate 700 due to the biasing force generated in the optical axis direction by the elastic members 800. In addition, a contact portion 1150*c* provided at the fifth lens frame 1150 contacts the second contact portion 700*e* of the second zoom base plate 700. Thereby, the third lens frame 1130 and the fifth lens frame 1150 can be positioned relative to the second zoom base plate 700 in the optical axis direction.

Moreover, as illustrated in FIG. 18A, the roller 1131 attached to the third lens frame 1130 contacts (by pressing) a third contact portion 700*f* in the corresponding rectangular hole 700*c* of the second zoom base plate 700 due to the biasing force generated about the optical axis by the elastic members 800. In addition, as illustrated in FIG. 18B, a contact portion 1150*d* in the corresponding rectangular hole 1150*a* of the fifth lens frame 1150 contacts the roller 701 attached to the second zoom base plate 700 due to the biasing force of the elastic members 800 about the optical axis. Thereby, the third lens frame 1130 and the fifth lens frame 1150 can be positioned relative to the second zoom base plate 700 in the circumferential direction.

Thus, the third lens frame 1130 and the fifth lens frame 1150 are positioned relative to the second zoom base plate 700 in both the optical axis direction and the circumferential direction. Thereby, it is not needed to provide engagement portions (hook portions) with an elastic member to the second zoom base plate 700 and each of the third lens frame 1130 and the fifth lens frame 1150, and the size of the second zoom unit 1102 can be reduced while its optical performance is maintained. Even when the third lens frame 1130 and the fifth lens frame 1150 are temporarily moved relative to the second zoom base plate 700 due to external force such as the impact applied to the interchangeable lens 101, the third lens frame 1130 and the fifth lens frame 1150 are returned to the original positions by the biasing force of the elastic members 800, and thereby optical performance degradation can be suppressed.

To generate this biasing force from the elastic members 800, the elastic members 800 may be tilted relative to the optical axis direction at an angle equal to or larger than 30° and equal to or smaller than 60°.

As illustrated in FIGS. 15 to 17, the elastic members 800 are housed inside concave portions 700*h* provided at an outer circumference portion of the second zoom base plate 700. Thus, the outer diameter of the second zoom unit 1102 can be smaller than that in a case where the elastic members 800 are provided along the outer circumferential surface of the second zoom base plate 700.

A description will now be given of the zoom operation of the interchangeable lens 101. The cam ring 108 and the zoom operation ring 103 are coupled to each other by a coupling member 1080, and as the user rotationally operates the zoom operation ring 103, the cam ring 108 rotates about the optical axis. Along with the rotational operation of the zoom operation ring 103, a click feeling is provided by the click mechanism 600.

Figure 20A:
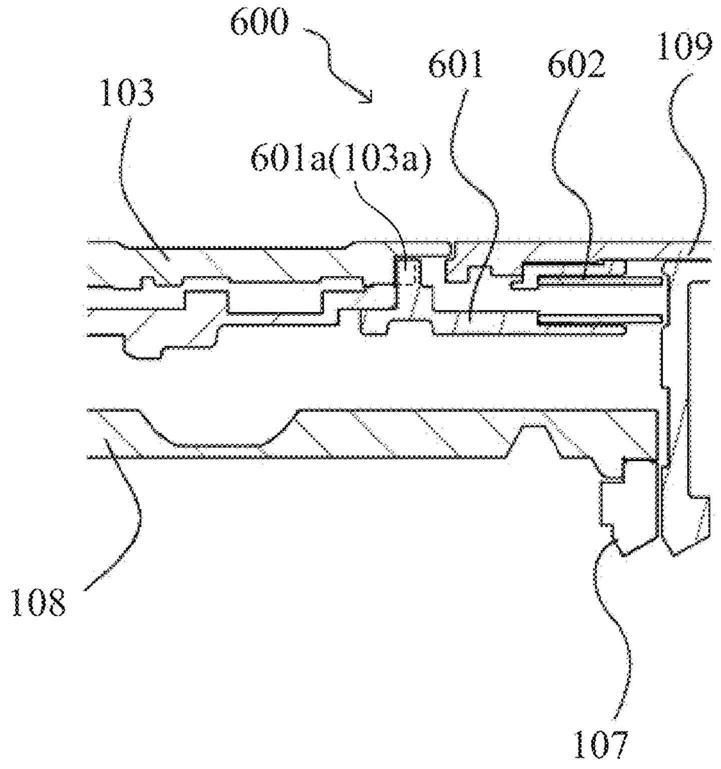
FIGS. 20A and 20B are a sectional view and a bottom view of a click mechanism according to this embodiment.
Figure 20B:
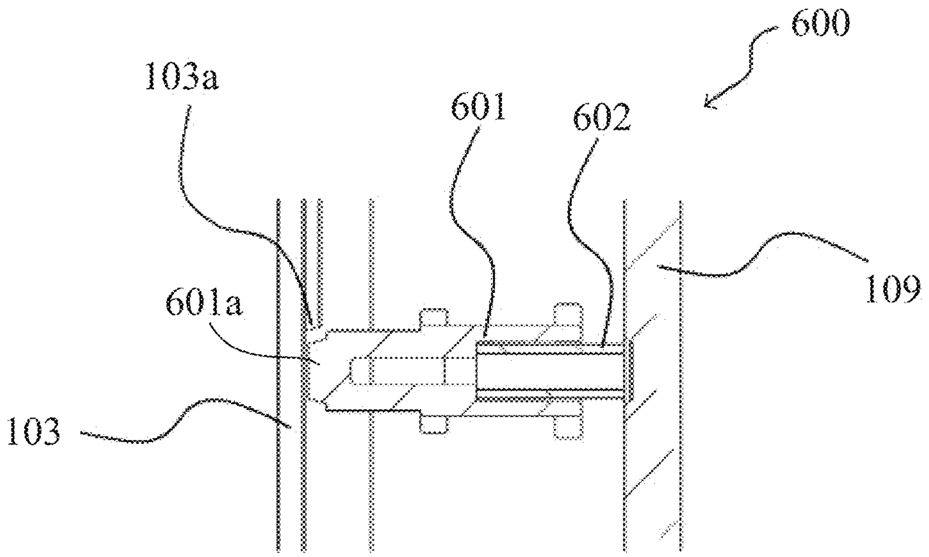
Figure 21:
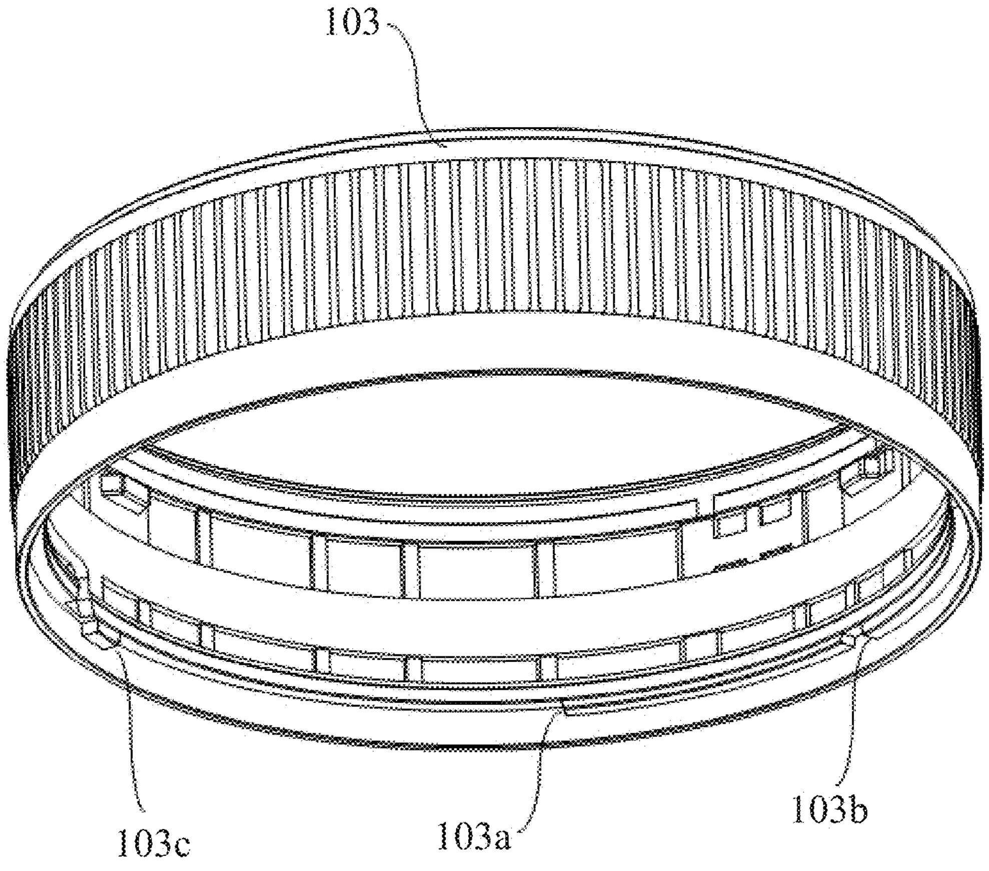
FIG. 21 is a perspective view of a zoom operation ring according to this embodiment.

FIG. 20A illustrates a section around the click mechanism 600 when viewed from the side, and FIG. 20B illustrates a section around the click mechanism 600 when viewed from the optical axis side. FIGS. 20A and 20B illustrate the click mechanism 600 near the wide-angle end in the imaging area of the interchangeable lens 101. FIG. 21 illustrates the zoom operation ring 103.

A pin member 601 is held by the fixed barrel 109 movably in the optical axis direction. As illustrated in FIG. 20B, a side surface of a tip portion 601*a* of the pin member 601 on the object side has a taper shape. In addition, a protrusion portion 103*a* having a taper shape as illustrated in FIG. 21 is provided at a position on an inner circumference portion of the zoom operation ring 103 at the same distance (radius) to the tip portion 601*a* of the pin member 601 and the optical axis. The protrusion portion 103*a* is disposed so that it contacts the tip portion 601*a* of the pin member 601 at a boundary with the housing area 108B in the imaging area 108C of the cam ring 108 illustrated in FIGS. 12 and 13.

A cylindrical portion is provided behind the pin member 601 on the image side of the tip portion 601*a*, and a biasing member 602 as a compression coil spring is inserted in the cylindrical portion. The biasing member 602 in the compressed state biases the pin member 601 against the zoom operation ring 103 with its end portion on the object side contacting the pin member 601 and its end portion on the image side contacting the fixed barrel 109.

As the zoom operation ring 103 is rotationally operated, a tapered surface of the protrusion portion 103*a* contacts a tapered surface of the tip portion 601*a* of the pin member 601. As the zoom operation ring 103 is further rotationally operated, the pin member 601 moves to the image side along the tapered surface of the protrusion portion 103*a*. Then, when the tip portion 601*a* of the pin member 601 crosses over the protrusion portion 103*a* moving in the rotational direction, the pin member 601 is moved to the object side (returned to the original position) by the biasing force of the biasing member 602.

Thus, a rotational load of the zoom operation ring 103 increases in a case where the protrusion portion 103*a* contacts the tip portion 601*a* of the pin member 601 and presses the pin member 601 to the image side against the biasing force of the biasing member 602, and the rotational load is released when the pin member 601 crosses over the protrusion portion 103*a*. Thereby, a click feeling occurs along with the rotational operation of the zoom operation ring 103. Due to this click feeling, the user can recognize an end on the housing area 108B side in the imaging area 108C of the cam ring 108 within a phase in which the zoom operation ring 103 is rotationally operable.

A proper click feeling can be set to the rotational operation of the zoom operation ring 103 by changing the angles of the tapered surfaces of the protrusion portion 103*a* and the tip portion 601*a* of the pin member 601 and the magnitude of the biasing force generated by the biasing member 602.

As illustrated in FIG. 21, a first contact portion 103*b* and a second contact portion 103*c* are provided at both sides of the protrusion portion 103*a* in the circumferential direction at a position on the inner circumference portion of the zoom operation ring 103 at the same distance to the tip portion 601*a* of the pin member 601 and the optical axis. In a case where the tip portion 601*a* of the pin member 601 as a rotation preventing member contacts the first contact portion 103*b* and the second contact portion 103*c*, the zoom operation ring 103 is prevented from further rotating and the cam ring 108 is prevented from rotating as well.

The first contact portion 103*b* is provided in a phase corresponding to the boundary between the assembly area 108A and the housing area 108B of the cam ring 108 illustrated in FIGS. 12 and 13. This configuration prevents the cam ring 108 from rotating from the housing area 108B to the assembly area 108A along with the rotational operation of the zoom operation ring 103. The second contact portion 103*c* is provided in a phase corresponding to the boundary between the imaging area 108C and the introduction area 108D of the cam ring 108. This configuration prevents the cam ring 108 from rotating from the imaging area 108C to the introduction area 108D along with the rotational operation of the zoom operation ring 103. Thus, the zoom operation ring 103 is rotationally operable when the cam ring 108 is located in the phases of the housing area 108B and the imaging area 108C.

In this embodiment, the linear barrel 950 is attached to the first zoom base plate 900 in the assembly area 108A in which the cam ring 108 is prevented from rotating along with the rotational operation of the zoom operation ring 103. Since the cam followers 900*a* do not contact the first cam groove portions 108*b* of the cam ring 108 in the assembly area 108A, the optical performance degradation due to attachment of the linear barrel 950 to the first zoom base plate 900 can be suppressed.

This embodiment uses the interchangeable lens 101 as an optical apparatus, but the components in the interchangeable lens 101 described in this embodiment are applicable to a lens barrel unit in a lens integrated type camera (optical apparatus). Moreover, in this embodiment, the cam ring 108 has the groove-shaped cam portions (cam groove portions), but the cam member may have protrusion-shaped cam portions.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This embodiment can provide an optical apparatus that can secure excellent optical performance and have a reduced size.

This application claims priority to Japanese Patent Application No. 2023-156593, which was filed on Sep. 22, 2023, and which is hereby incorporated by reference herein in its entirety.

What is claimed is:

1. An optical apparatus comprising:

a first holder holding a first lens, and a second holder holding a second lens, the first holder and the second holder being arranged in an optical axis direction;

a base member configured to hold the first holder and the second holder so that positions of the first holder and the second holder are adjustable;

an elastic member engaged with and provided between the first holder and the second holder;

a third lens movable in the optical axis direction and disposed between the first lens and the second lens; and a driver configured to drive the third lens in the optical axis direction and fixed in a phase area of the base member in which the elastic member is not disposed in a direction about an optical axis, wherein the elastic member biases the first holder and the second holder so that the first holder and the second holder approach each other in the optical axis direction and contact the base member.

2. The optical apparatus according to claim 1, further comprising an adjusting member attached to one of the base member, the first holder, and the second holder, and configured to contact another member to adjust the positions, wherein the elastic member biases the first holder and the second holder in opposite directions about an optical axis so that the adjusting member and the other member contact each other.

3. The optical apparatus according to claim 1, wherein the elastic member is engaged with and provided between the first holder and the second holder so that the elastic member is tilted relative to the optical axis direction.

4. The optical apparatus according to claim 3, wherein the elastic member is tilted relative to the optical axis direction at an angle equal to or larger than 30° and equal to or smaller than 60°.

5. The optical apparatus according to claim 1, wherein the elastic member is disposed inside a concave portion provided at an outer circumference portion of the base member.

* * * * *